United States Patent
Hironaka et al.

(10) Patent No.: US 10,537,859 B2
(45) Date of Patent: Jan. 21, 2020

(54) GAS SEPARATION MEMBRANE, GAS SEPARATION MODULE, GAS SEPARATION DEVICE, GAS SEPARATION METHOD, AND POLYIMIDE COMPOUND

(71) Applicant: FUJIFILM Corporation, Tokyo (JP)

(72) Inventors: Koji Hironaka, Kanagawa (JP); Satoshi Sano, Kanagawa (JP); Yusuke Iizuka, Kanagawa (JP); Sotaro Inomata, Kanagawa (JP); Keisuke Kodama, Kanagawa (JP); Tetsu Kitamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 15/806,336

(22) Filed: Nov. 8, 2017

(65) Prior Publication Data
US 2018/0085716 A1   Mar. 29, 2018

Related U.S. Application Data

(63) Continuation of application No. PCT/JP2016/058085, filed on Mar. 15, 2016.

(30) Foreign Application Priority Data

Jun. 30, 2015 (JP) .................................. 2015-131191

(51) Int. Cl.
*B01D 71/64* (2006.01)
*B01D 53/22* (2006.01)
(Continued)

(52) U.S. Cl.
CPC .......... *B01D 71/64* (2013.01); *B01D 53/228* (2013.01); *B01D 69/02* (2013.01); *B01D 69/125* (2013.01);
(Continued)

(58) Field of Classification Search
CPC ...... B01D 53/228; B01D 69/12; B01D 71/64; B01D 2257/504; B01D 2323/30; C08G 73/1039; C08G 73/1067
See application file for complete search history.

(56) References Cited

U.S. PATENT DOCUMENTS 5,112,941 A * 5/1992 Kasai ................... B01D 71/64
                                                       528/128
5,618,334 A * 4/1997 Ozcayir ............... B01D 53/228
                                                       210/500.39
(Continued)

FOREIGN PATENT DOCUMENTS

CN         1760236       4/2006
JP         H08-333451    12/1996
(Continued)

OTHER PUBLICATIONS

"Notification of Reasons for Refusal of Japan Counterpart Application," dated Aug. 14, 2018, with English translation thereof, p. 1-p. 6.

(Continued)

*Primary Examiner* — Jason M Greene
(74) *Attorney, Agent, or Firm* — JCIPRNET

(57) ABSTRACT

A gas separation membrane includes a gas separation layer containing a polyimide compound having a repeating unit represented by Formula (I),

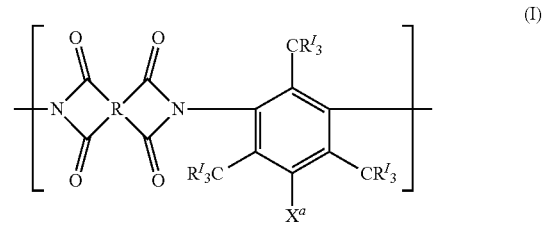

in Formula (I), $R^I$ represents a hydrogen atom, an alkyl group, or a halogen atom, $X^a$ represents a sulfamoyl group, an alkoxysulfonyl group, a carboxy group, a hydroxy group, an acyloxy group, or a halogen atom, and R represents a mother nucleus having a specific structure.

16 Claims, 2 Drawing Sheets

(51) Int. Cl.
   *B01D 69/02* (2006.01)
   *B01D 69/12* (2006.01)
   *C08G 73/10* (2006.01)

(52) U.S. Cl.
   CPC ...... *C08G 73/1067* (2013.01); *B01D 2325/20* (2013.01); *C08G 2340/00* (2013.01)

(56) References Cited

U.S. PATENT DOCUMENTS

| | | | |
|---|---|---|---|
| 5,744,575 A | 4/1998 | Nakanishi et al. | |
| 2004/0107830 A1* | 6/2004 | Simmons | B01D 53/228 95/45 |
| 2004/0177753 A1* | 9/2004 | Chung | B01D 53/228 95/43 |
| 2011/0094379 A1* | 4/2011 | Cordatos | B01D 53/228 95/51 |
| 2012/0323059 A1* | 12/2012 | Liu | B01D 71/64 585/818 |
| 2014/0130669 A1 | 5/2014 | Sano et al. | |
| 2014/0345456 A1* | 11/2014 | Sano | B01D 71/64 95/51 |
| 2014/0345457 A1* | 11/2014 | Balster | B01D 71/64 95/53 |
| 2016/0199790 A1* | 7/2016 | Usami | B01D 69/12 95/51 |

FOREIGN PATENT DOCUMENTS

| | | | |
|---|---|---|---|
| JP | 2007-297605 | 11/2007 | |
| JP | 2013/046903 | 3/2013 | |
| JP | 2015-83296 | * 4/2015 | ............ B01D 71/64 |
| JP | 2015-083296 | 4/2015 | |

OTHER PUBLICATIONS

Tanaka et al., "The Effects of CO2-Conditioning of Polymers on Positron Annihilation and Gas Permeation Properties", Bull. Chem. Soc. Jpn., Jan. 1995, pp. 3011-3017.

"International Search Report (Form PCT/ISA/210) of PCT/JP2016/058085", with English translation thereof, dated Jun. 21, 2016, pp. 1-6.

"Written Opinion (Form PCT/ISA/237) of PCT/JP2016/058085", dated Jun. 21, 2016, with English translation thereof, pp. 1-13.

* cited by examiner

GAS SEPARATION MEMBRANE, GAS SEPARATION MODULE, GAS SEPARATION DEVICE, GAS SEPARATION METHOD, AND POLYIMIDE COMPOUND

CROSS-REFERENCE TO RELATED APPLICATIONS

This application is a Continuation of PCT International Application No. PCT/JP2016/58085, filed on Mar. 15, 2016, which claims priority under 35 U.S.C. § 119(a) to Japanese Patent Application No. 2015-131191, filed on Jun. 30, 2015. Each of the above application(s) is hereby expressly incorporated by reference, in its entirety, into the present application.

BACKGROUND OF THE INVENTION

1. Field of the Invention

The present invention relates to a gas separation membrane, a gas separation module, a gas separation device, a gas separation method, and a polyimide compound.

2. Description of the Related Art

A material formed of a polymer compound has a gas permeability specific to the material. Based on this property, it is possible to cause selective permeation and separation out of a target gas component using a membrane formed of a specific polymer compound. As an industrial application for this gas separation membrane related to the problem of global warming, separation and recovery from large-scale carbon dioxide sources using this gas separation membrane has been examined in thermal power plants, cement plants, or ironworks blast furnaces. Further, this membrane separation technique has been attracting attention as a means for solving environmental issues which can be performed with relatively little energy. In addition, natural gas or biogas (gas generated due to fermentation or anaerobic digestion, for example, biological excrement, organic fertilizers, biodegradable substances, sewage, garbage, or energy crops) is mixed gas mainly containing methane and carbon dioxide, and a membrane separation method is being examined as a means for removing impurities such as the carbon dioxide and the like (JP2007-297605A).

In purification of natural gas using a membrane separation method, excellent gas permeability and gas separation selectivity are required in order to more efficiently separate gas. Various membrane materials have been examined for the purpose of realizing excellent gas permeability and separation selectivity and a gas separation membrane using a polyimide compound has been examined as part of examination of membrane materials. For example, Bulletin of the Chemical Society of Japan (1995, Vol. 68, No. 11, pp. 3011 to 3017) describes that a polyimide compound having tetramethyl phenylenediamine has an excellent gas permeability. Further, CN1760236A describes that gas permeability and gas separation selectivity are improved by using a polyimide compound formed of a diamine having a specific structure.

In an actual plant, a membrane is plasticized due to high-pressure conditions and impurities (for example, benzene, toluene, and xylene) present in natural gas and this leads to degradation of gas separation selectivity, which is problematic. Therefore, it is required for a gas separation membrane to have not only improved gas permeability and gas separation selectivity but also plasticization resistance so that improved gas permeability and gas separation selectivity can be maintained even under high-pressure conditions or in the presence of the impurities described above. JP2015-083296A describes that, by employing a 1,3-phenylenediamine component having substituents at the 2-position and at least one of the 4-, 5-, or 6-positions as a diamine component of a polyimide compound and using a specific polar group as at least one substituent from among the substituent at the 2-position and the substituent at the 4- to 6-positions of the diamine component, a gas separation membrane obtained by using the polyimide compound for a gas separation layer has excellent gas permeability and gas separation selectivity even under high-pressure conditions and exhibits high resistance (plasticization resistance) to impurities such as toluene.

In order to obtain a practical gas separation membrane, it is necessary to ensure sufficient gas permeability by making a gas separation layer thinner, and then to realize improved gas separation selectivity. As a method for thinning a gas separation layer, a method of making a portion contributing to separation into a thin layer referred to as a compact layer or a skin layer by forming a polymer compound such as a polyimide compound into an asymmetric membrane using a phase separation method may be exemplified. In this asymmetric membrane, a portion other than a compact layer is allowed to function as a support layer responsible for the mechanical strength of the membrane.

Further, in addition to the asymmetric membrane, the form of a composite membrane obtained by forming a gas separation layer responsible for a gas separation function and a support layer responsible for mechanical strength with different materials and forming the gas separation layer having gas separation capability into a thin layer on the gas permeating support layer is known.

SUMMARY OF THE INVENTION

Typically, gas permeability and gas separation selectivity are in a trade-off relationship. Therefore, by adjusting a copolymerization component of a polyimide compound used for a gas separation layer, any of the gas permeability and the gas separation selectivity of the gas separation layer can be improved, but it is considered to be difficult to achieve both properties at high levels.

An object of the present invention is to provide a gas separation membrane which has excellent gas permeability and gas separation selectivity, exhibits excellent gas permeability and gas separation selectivity even under high-pressure conditions, and includes a gas separation layer that is unlikely to be affected by impurities such as toluene present in natural gas. Further, another object of the present invention is to provide a gas separation module, a gas separation device, and a gas separation method using the gas separation membrane. Furthermore, still another object of the present invention is to provide a polyimide compound suitable for forming a gas separation layer of the gas separation membrane.

As the result of intensive research conducted by the present inventors in view of the above-described objects, it was found that, by employing a 1,3-phenylenediamine component having an alkyl group having specific structures at the 2-, 4-, and 6-positions as a diamine component of a polyimide compound constituting a gas separation layer and introducing a specific polar group into a place of the 5-position of the diamine component, a gas separation membrane which has excellent gas permeability and gas separation selectivity even under high-pressure conditions and exhibits excellent resistance (plasticization resistance) to impurities such as toluene can be obtained. The present invention has been completed based on these findings.

The above-described objects are achieved by the following means.

[1] A gas separation membrane comprising: a gas separation layer containing a polyimide compound, in which the polyimide compound has a repeating unit represented by Formula (I),

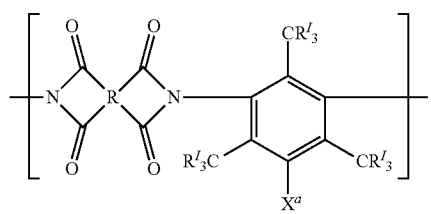
(I)

in Formula (I), $R^I$ represents a hydrogen atom, an alkyl group, or a halogen atom, and $X^a$ represents a sulfamoyl group, an alkoxysulfonyl group, a carboxy group, a hydroxy group, an acyloxy group, or a halogen atom, and R represents a group having a structure represented by any of Formulae (I-1) to (I-28), where $X^1$ to $X^3$ each independently represent a single bond or a divalent linking group, L represents —CH=CH— or —CH$_2$—, $R^1$ and $R^2$ each independently represent a hydrogen atom or a substituent, and the symbol "*" represents a binding site with respect to a carbonyl group in Formula (I).

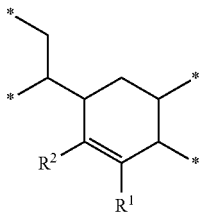
(I-1)

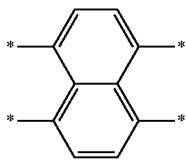
(I-2)

(I-3)

(I-4)

(I-5)

(I-6)

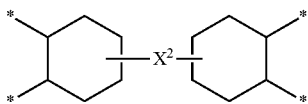
(I-7)

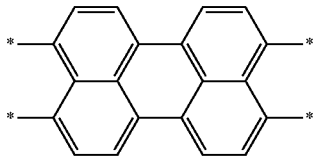
(I-8)

(I-9)

(I-10)

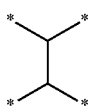
(I-11)

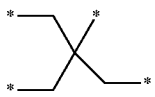
(I-12)

(I-13)

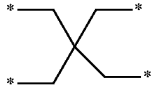
(I-14)

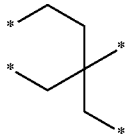
(I-15)

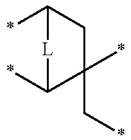
(I-16)

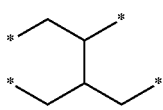
(I-17)

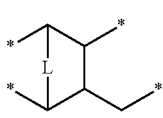

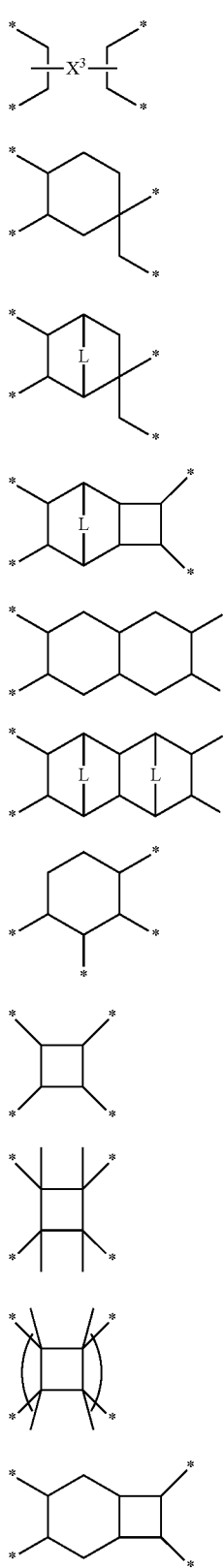

(I-18)
(I-19)
(I-20)
(I-21)
(I-22)
(I-23)
(I-24)
(I-25)
(I-26)
(I-27)
(I-28)

[2] The gas separation membrane according to [1], in which the repeating unit represented by Formula (I) is a repeating unit represented by Formula (I-a),

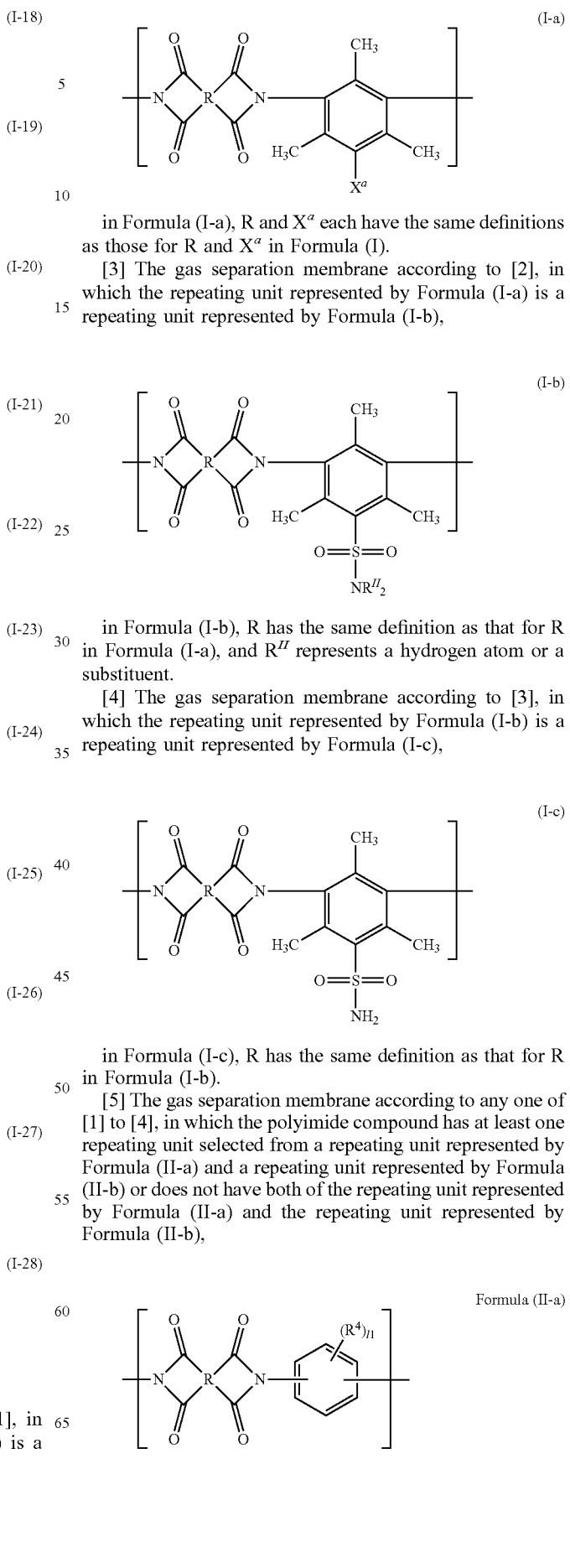

in Formula (I-a), R and $X^a$ each have the same definitions as those for R and $X^a$ in Formula (I).

[3] The gas separation membrane according to [2], in which the repeating unit represented by Formula (I-a) is a repeating unit represented by Formula (I-b), in Formula (I-b), R has the same definition as that for R in Formula (I-a), and $R^{II}$ represents a hydrogen atom or a substituent.

[4] The gas separation membrane according to [3], in which the repeating unit represented by Formula (I-b) is a repeating unit represented by Formula (I-c), in Formula (I-c), R has the same definition as that for R in Formula (I-b).

[5] The gas separation membrane according to any one of [1] to [4], in which the polyimide compound has at least one repeating unit selected from a repeating unit represented by Formula (II-a) and a repeating unit represented by Formula (II-b) or does not have both of the repeating unit represented by Formula (II-a) and the repeating unit represented by Formula (II-b), Formula (II-b)

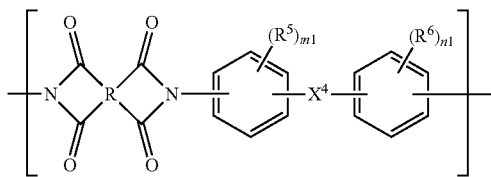

in Formulae (II-a) and (II-b), R has the same definition as that for R in Formula (I), $R^4$ to $R^6$ each independently represent a substituent, l1, m1, and n1 each independently represent an integer of 0 to 4, and $X^4$ represents a single bond or a divalent linking group, where the repeating unit represented by Formula (II-a) does not include the repeating unit represented by Formula (I).

[6] The gas separation membrane according to [5], in which the ratio of the molar amount of the repeating unit represented by Formula (I) to the total molar amount of the repeating unit represented by Formula (I), the repeating unit represented by Formula (II-a), and the repeating unit represented by Formula (II-b) in the polyimide compound is in a range of 50% to 100% by mole.

[7] The gas separation membrane according to [6], in which the polyimide compound consists of the repeating unit represented by Formula (I) or the remainder other than the repeating unit represented by Formula (I) consists of the repeating unit represented by Formula (II-a) or (II-b) in a case where the polyimide compound has a repeating unit other than the repeating unit represented by Formula (I).

[8] The gas separation membrane according to any one of [1] to [7], in which the polyimide compound is a polyimide compound in which a cross-linked structure is formed using a metal alkoxide as a crosslinking agent.

[9] The gas separation membrane according to any one of [1] to [8], in which the gas separation membrane is a gas separation composite membrane which includes a gas permeating support layer and the gas separation layer on the upper side of the support layer.

[10] The gas separation membrane according to [9], in which the support layer includes a non-woven fabric layer and a porous layer in this order.

[11] The gas separation membrane according to any one of [1] to [10], in which, in a case where gas to be subjected to a separation treatment is mixed gas of carbon dioxide and methane, a permeation rate of carbon dioxide at 30° C. and 5 MPa is greater than 20 GPU and a ratio ($R_{CO2}/R_{CH4}$) between permeation rates of carbon dioxide and methane is 15 or greater.

[12] The gas separation membrane according to any one of [1] to [11], which is used for selective permeation of carbon dioxide from gas containing the carbon dioxide and methane.

[13] A gas separation module comprising: the gas separation membrane according to any one of [1] to [12].

[14] A gas separation device comprising: the gas separation module according to [13].

[15] A gas separation method comprising: selectively permeating carbon dioxide from gas containing the carbon dioxide and methane using the gas separation membrane according to any one of [1] to [12].

[16] A polyimide compound having a repeating unit represented by Formula (I),

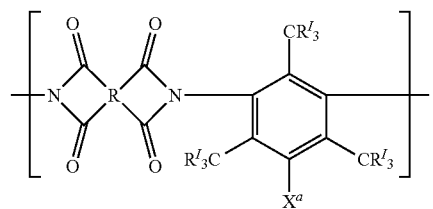

in Formula (I), $R^I$ represents a hydrogen atom, an alkyl group, or a halogen atom, and $X^a$ represents a sulfamoyl group, an alkoxysulfonyl group, a carboxy group, a hydroxy group, an acyloxy group, or a halogen atom, and R represents a group having a structure represented by any of Formulae (I-1) to (I-28), where $X^1$ to $X^3$ each independently represent a single bond or a divalent linking group, L represents —CH=CH— or —CH$_2$—, $R^1$ and $R^2$ each independently represent a hydrogen atom or a substituent, and the symbol "*" represents a binding site with respect to a carbonyl group in Formula (I).

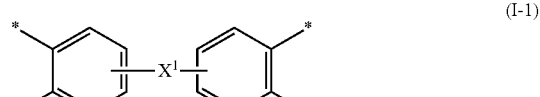

(I-1)

(I-2)

(I-3)

(I-4)

(I-5)

(I-6)

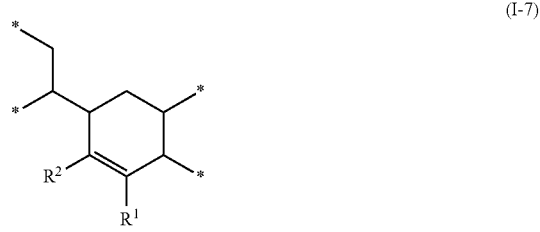

(I-7)

-continued (I-8) 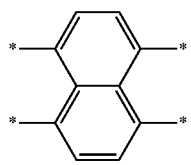

(I-9) 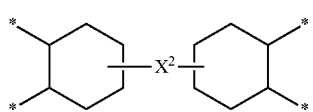

(I-10) 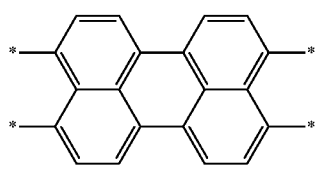

(I-11) 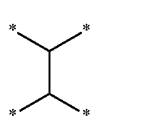

(I-12) 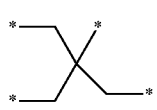

(I-13) 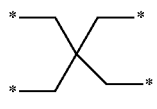

(I-14) 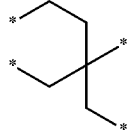

(I-15) 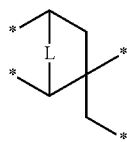

(I-16) 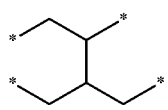

(I-17) 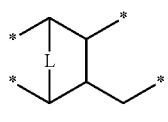

(I-18) 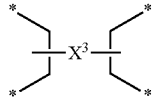

(I-19) 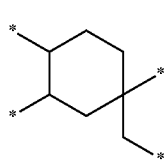

-continued (I-20) 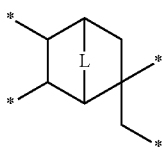

(I-21) 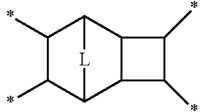

(I-22) 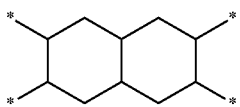

(I-23) 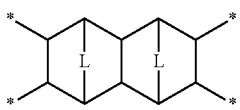

(I-24) 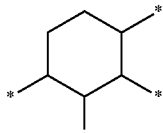

(I-25) 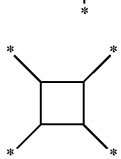

(I-26) 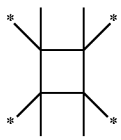

(I-27) 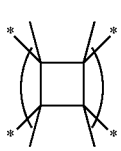

(I-28) 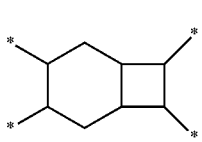

In the present specification, in a case where a plurality of substituents or linking groups (hereinafter, referred to as substituents or the like) shown by specific symbols are present or a plurality of substituents are defined simultaneously or alternatively, this means that the respective substituents may be the same as or different from each other. The same applies to the definition of the number of substituents or the like. Moreover, in a case where there is a repetition of a plurality of partial structures shown by means of the same display in the formula, the respective partial structures or repeating units may be the same as or different from each other. In addition, even in a case where not specifically stated and a plurality of substituents or the like are adjacent to each other, this means that they may be condensed or linked to each other and form a ring.

In regard to compounds or groups described in the present specification, the description includes salts thereof and ions thereof in addition to the compounds or the groups. Further, the description includes derivatives obtained by changing a part of the structure thereof within the range in which the effects of the purpose are exhibited.

A substituent (the same applies to a linking group) in which substitution or unsubstitution is not specified in the present specification may include an arbitrary substituent of the group within a range in which desired effects are exhibited. The same applies to a compound in which substitution or unsubstitution is not specified.

A preferable range of a group Z of substituents described below is set as a preferable range of a substituent in the present specification unless otherwise specified.

The gas separation membrane, the gas separation module, and the gas separation device of the present invention have excellent gas permeability even under high-pressure conditions and also have excellent gas separation selectivity. Further, degradation of the gas separation selectivity is unlikely to occur even in a case where the gas separation membrane, the gas separation module, and the gas separation device of the present invention are used for separation of gas containing impurities such as toluene.

According to the gas separation method of the present invention, gas can be separated with excellent gas permeability and excellent gas separation selectivity even under high-pressure conditions. Further, excellent gas separation selectivity is maintained even in a case where impurities are present in gas to be separated. Further, the polyimide compound of the present invention can be suitably used to form a gas separation layer of the gas separation membrane.

DESCRIPTION OF THE PREFERRED EMBODIMENTS

Figure 1:
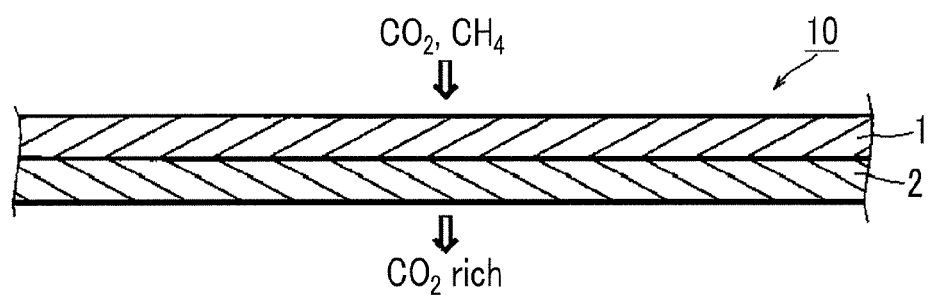
FIG. 1 is a cross-sectional view schematically illustrating an embodiment of a gas separation composite membrane according to the present invention.

Hereinafter, the present invention will be described in detail.

A gas separation membrane of the present invention contains a polyimide compound specific in the gas separation layer.

[Polyimide Compound]

The polyimide compound used in the present invention has at least a repeating unit represented by Formula (I).

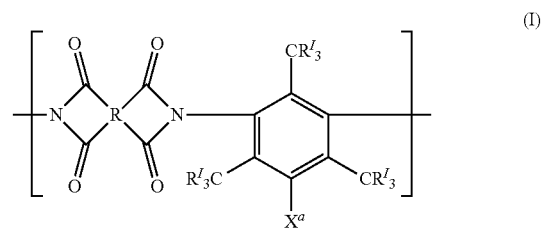

(I)

In Formula (I), $R^I$ represents a hydrogen atom, an alkyl group, or a halogen atom. $X^a$ represents a sulfamoyl group, an alkoxysulfonyl group, a carboxy group, a hydroxy group, an acyloxy group, or a halogen atom, R represents a group having a structure represented by any of Formulae (I-1) to (I-28). Here, $X^1$ to $X^3$ each independently represent a single bond or a divalent linking group, L represents —CH=CH— or —CH$_2$—, $R^1$ and $R^2$ each independently represent a hydrogen atom or a substituent, and the symbol "*" represents a binding site with respect to a carbonyl group in Formula (I). R represents preferably a group represented by Formula (I-1), (I-2), or (I-4), more preferably a group represented by Formula (I-1) or (I-4), and particularly preferably a group represented by Formula (I-1).

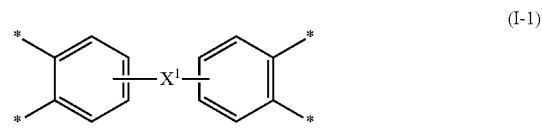

(I-1)

(I-2)

(I-3)

(I-4)

(I-5)

(I-6)

(I-7)

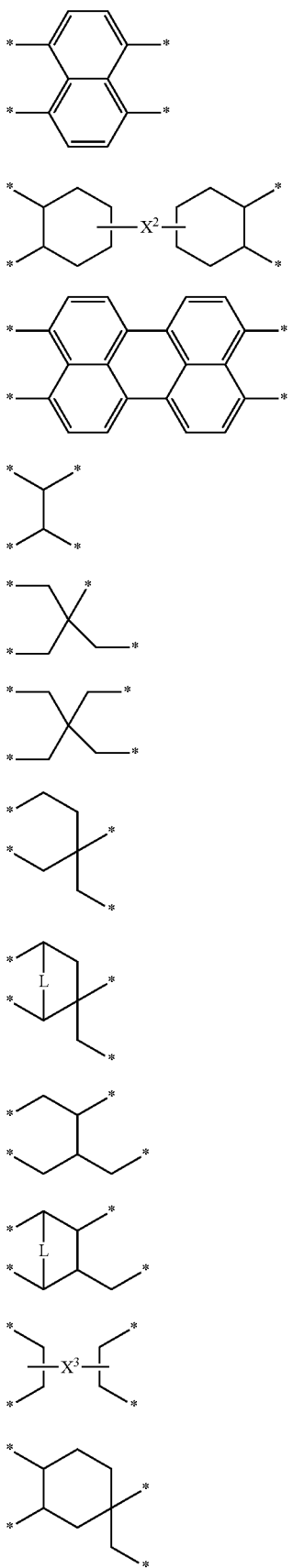

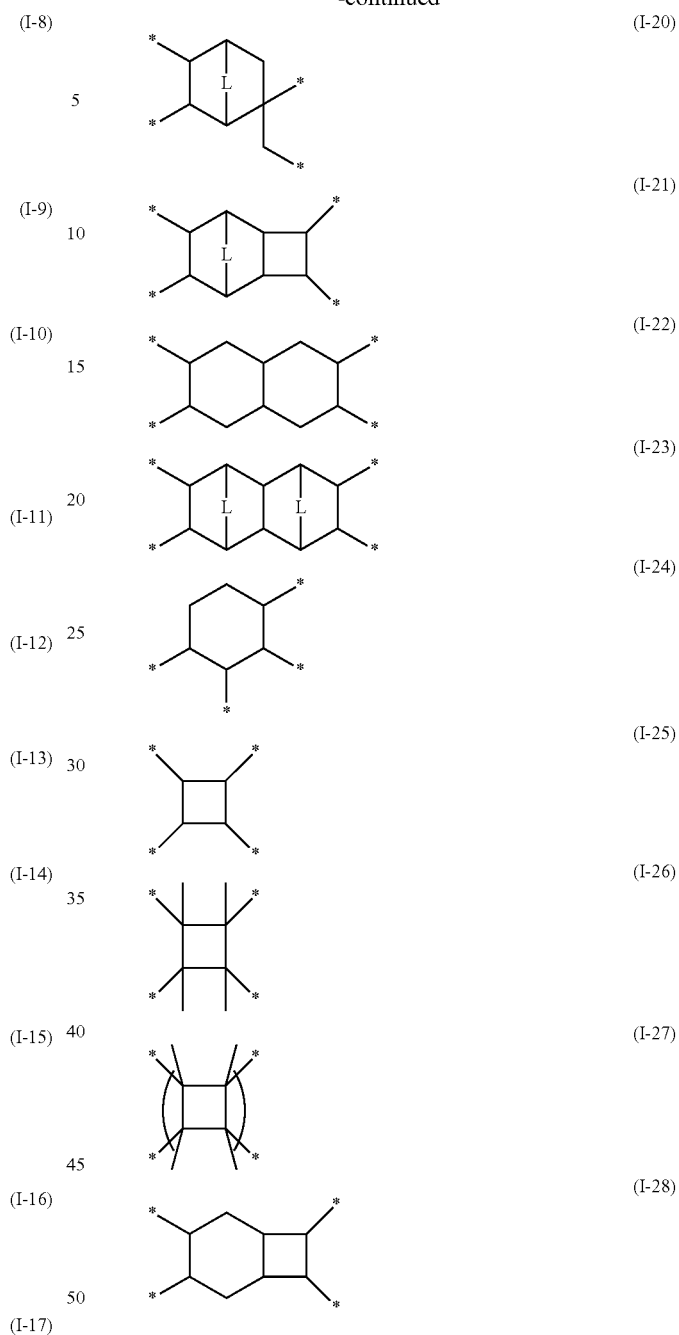

In Formulae (I-1), (I-9), and (I-18), $X^1$ to $X^3$ each independently represent a single bond or a divalent linking group. As the divalent linking group, —C($R^x$)$_2$— ($R^x$ represents a hydrogen atom or a substituent, and in a case where $R^x$ represents a substituent, $R^x$'s may be linked to each other to form a ring), —O—, —SO$_2$—, —C(=O)—, —S—, —NR$^Y$— ($R^Y$ represents a hydrogen atom, an alkyl group (preferably methyl or ethyl), an aryl group (preferably phenyl)), —C$_6$H$_4$-(phenylene), or a combination of these is preferable. It is more preferable that $X^1$ to $X^3$ represent a single bond or —C($R^x$)$_2$—. In a case where $R^x$ represents a substituent, specific examples thereof include groups selected from a group Z of substituents described below. Among these, an alkyl group (the preferable range is the same as that of the alkyl group in the group Z of substituents described below) is preferable, an alkyl group having a halogen atom as a substituent is more preferable, and trifluoromethyl is particularly preferable. Moreover, in Formula (I-18), $X^3$ is linked to any one of two carbon atoms shown on the left side of $X^3$ and any one of two carbon atoms shown on the right side of $X^3$.

In Formulae (I-4), (I-15), (I-17), (I-20), (I-21), and (I-23), L represents —CH=CH— or —CH$_2$—.

In Formula (I-7), $R^1$ and $R^2$ each independently represent a hydrogen atom or a substituent. Examples of the substituent include groups selected from the group Z of substituents described below. $R^1$ and $R^2$ may be bonded to each other to form a ring.

$R^1$ and $R^2$ represent preferably a hydrogen atom or an alkyl group, more preferably a hydrogen atom, methyl, or ethyl, and still more preferably a hydrogen atom.

The carbon atoms shown in Formulae (I-1) to (I-28) may further include a substituent. Specific examples of the substituent include groups selected from the group Z of substituents described below. Among these, an alkyl group or an aryl group is preferable.

In Formula (I), $R^I$ represents a hydrogen atom, an alkyl group, or a halogen atom. The alkyl group may be linear or branched. The number of carbon atoms of the alkyl group which can be employed as $R^I$ is preferably in a range of 1 to 5, more preferably in a range of 1 to 3, and still more preferably 1 or 2. The alkyl group which can be employed as $R^I$ may include a heteroatom (preferably an oxygen atom or a sulfur atom) in the chain thereof. Preferred specific examples of the alkyl group as $R^I$ include methyl and ethyl. Among these, methyl is more preferable.

Examples of the halogen atom which can be employed as $R^I$ include a bromine atom, a chlorine atom, an iodine atom, and a fluorine atom. Among these, a bromine atom is more preferable.

$R^I$ represents more preferably a hydrogen atom, methyl, or a bromine atom, still more preferably a hydrogen atom or methyl, and even still more preferably a hydrogen atom.

In Formula (I), $X^a$ represents a sulfamoyl group, an alkoxysulfonyl group, a carboxy group, a hydroxy group, an acyloxy group, or a halogen atom.

The sulfamoyl group which can be employed as $X^a$ may be unsubstituted or include a substituent. Specifically, it is preferable that the sulfamoyl group which can be employed as $X^a$ is unsubstituted or monoalkyl-substituted or dialkyl-substituted, more preferable that the sulfamoyl group is unsubstituted or monoalkyl-substituted, and particularly preferable that the sulfamoyl group is unsubstituted. In other words, in a case where the sulfamoyl group which can be employed as $X^a$ includes a substituent, an alkyl group is preferable as the substituent. The alkyl group may be linear or branched, and the number of carbon atoms is preferably in a range of 1 to 10, more preferably in a range of 1 to 5, and still more preferably in a range of 1 to 3. Further, it is preferable that the alkyl group includes a halogen atom as a substituent and also preferable that the alkyl group includes a fluorine atom as a substituent. Preferred specific examples of the alkyl group contained in the sulfamoyl group include methyl, ethyl, n-propyl, —CH$_2$CF$_2$CF$_2$CF$_3$, —CH$_2$CF$_2$CF$_3$, and —CH$_2$CF$_3$.

Among these, in a case where the sulfamoyl group is monoalkyl-substituted, it is preferable that the alkyl group is methyl or an alkyl group having a fluorine atom as a substituent and more preferable that the alkyl group is methyl, —CH$_2$CF$_2$CF$_2$CF$_3$, or —CH$_2$CF$_3$.

Further, in a case where the sulfamoyl group is dialkyl-substituted, it is preferable that the alkyl group is methyl.

Further, it is also preferable that the sulfamoyl group which can be employed as $X^a$ includes a cycloalkyl group as a substituent. The number of carbon atoms of the cycloalkyl group is preferably in a range of 3 to 15 and more preferably in a range of 6 to 10. Among these, it is preferable that the cycloalkyl group is adamantyl. In a case where the sulfamoyl group which can be employed as $X^a$ includes a cycloalkyl group as a substituent, the number of cycloalkyl groups included in the sulfamoyl group is preferably one. That is, it is preferable that the sulfamoyl group is mono-substituted.

It is more preferable that the sulfamoyl group which can be employed as $X^a$ is unsubstituted.

The number of carbon atoms of the alkoxysulfonyl group which can be employed as $X^a$ is preferably in a range of 1 to 5 and more preferably in a range of 1 to 3. As the alkoxy group in the alkoxysulfonyl group which can be employed as $X^a$, methoxy or ethoxy is preferable and methoxy is more preferable.

The number of carbon atoms of the acyloxy group which can be employed as $X^a$ is preferably in a range of 2 to 5 and more preferably 2 or 3. Among examples of such acyloxy group, acetoxy is preferable.

Examples of the halogen atom which can be employed as $X^a$ include a bromine atom, a chlorine atom, an iodine atom, and a fluorine atom. Among these, a bromine atom is more preferable.

As $X^a$, a sulfamoyl group, an alkoxysulfonyl group, a carboxy group, a hydroxy group, or an acyloxy group is preferable; a sulfamoyl group, an alkoxysulfonyl group, a carboxy group, or a hydroxy group is more preferable; a sulfamoyl group, a carboxy group, or a hydroxy group is still more preferable; and a sulfamoyl group is particularly preferable.

All of the gas permeability, the gas separation selectivity, and the plasticization resistance of the gas separation membrane to be obtained can be further improved by forming a gas separation layer using a polyimide compound having a repeating unit represented by Formula (I). The reason thereof is not clear, but the flatness and packing properties of the polyimide compound are moderately suppressed by allowing the repeating unit represented by Formula (I) to have three $CR^I_3$'s in a diamine component. In this manner, it is assumed that the free volume fraction is increased and the gas permeability is improved. Further, the polyimide compound is appropriately densified and the mobility thereof is degraded in a case where the repeating unit represented by Formula (I) includes a specific polar group $X^a$. With this configuration, it is assumed that the permeability with respect to a molecule having a large dynamic molecular diameter can be effectively suppressed and the gas separation selectivity can be further improved.

The polyimide compound having a repeating unit represented by Formula (I) contains a diamine component having three $CR^I_3$ groups. Since the polyimide compound containing a large amount of alkyl groups has a low polarity, there is a tendency that the affinity of the polyimide compound for impurities having a low polarity such as toluene is increased and the plasticization resistance is degraded. However, the polyimide compound used in the present invention contains a specific polar group $X^a$ in a specific site in addition to three $CR^I_3$ groups in the diamine component. With this configuration, it is assumed that a gas separation membrane which exhibits excellent gas permeability and gas separation selectivity and is excellent in plasticization resistance and in which the affinity for impurities is suppressed by the polar group $X^a$ can be produced.

The polyimide compound used in the present invention may be in the form of being cross-linked by a crosslinking agent. For example, in a case where the polar group $X^a$ includes an unsubstituted or mono-substituted sulfamoyl group, a metal alkoxide such as tetraisopropyl orthotitanate can be used as a crosslinking agent for the purpose of forming a cross-linked structure through an NH group of the sulfamoyl group. Further, in a case where $CR^I_3$ includes halogen atoms, a crosslinking agent such as dimethylaminopropyltriethoxysilane or tetramethylethylenediamine can be used for the purpose of causing a nucleophilic addition reaction.

Further, in a case where the polyimide compound used in the present invention has a repeating unit represented by Formula (II-a) or (II-b), the polyimide compound may be in the form of being cross-linked by a crosslinking agent containing a group which can be reacted with a functional group contained in these repeating units.

It is preferable that the repeating unit represented by Formula (I) is a repeating unit represented by Formula (I-a).

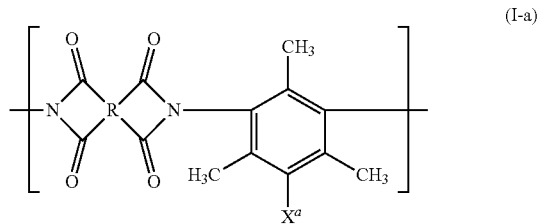

(I-a)

In Formula (I-a), R and $X^a$ have the same definitions as those for R and $X^a$ in Formula (I) and the preferable forms thereof are respectively the same as each other.

It is preferable that the repeating unit represented by Formula (I-a) is a repeating unit represented by Formula (I-b).

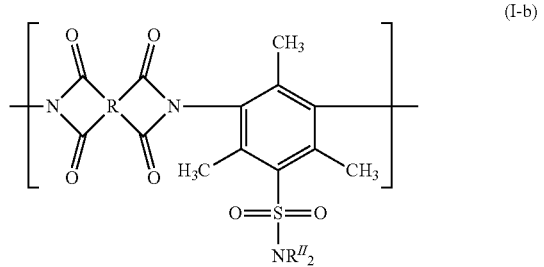

(I-b)

In Formula (I-b), R has the same definition as that for R in Formula (I-a) and the preferable forms are the same as each other.

$R^{II}$ represents a hydrogen atom or a substituent. It is preferable that at least one $R^{II}$ of two $R^{II}$'s represents a hydrogen atom and more preferable that two $R^{II}$'s both represent a hydrogen atom. In a case where $R^{II}$ represents a substituent, a group selected from the group Z of substituents described below is preferable and an alkyl group or a cycloalkyl group is more preferable.

The alkyl group which can be employed as $R^{II}$ may be linear or branched, and the number of carbon atoms thereof is preferably in a range of 1 to 10, more preferably in a range of 1 to 5, and still more preferably in a range of 1 to 3. Further, it is preferable that the alkyl group includes a halogen atom as a substituent and also preferable that the alkyl group includes a fluorine atom as a substituent. Preferred specific examples of the alkyl group as $R^{II}$ include methyl, ethyl, n-propyl, —$CH_2CF_2CF_2CF_3$, —$CH_2CF_2CF_3$, and —$CH_2CF_3$.

Further, in a case where one of two $R^{II}$'s represents a hydrogen atom and the other represents an alkyl group, it is preferable that the alkyl group is methyl or includes a fluorine atom as a substituent and more preferable that the alkyl group is methyl, —$CH_2CF_2CF_2CF_3$, or —$CH_2CF_3$.

Further, in a case where two $R^{II}$'s both represent an alkyl group, it is preferable that the alkyl group is methyl.

The cycloalkyl group which can be employed as $R^{II}$ has preferably 3 to 15 carbon atoms and more preferably 6 to 10 carbon atoms. In a case where $R^{II}$ represents a cycloalkyl group, it is preferable that the cycloalkyl group is adamantyl. In a case where one of two $R^{II}$'s represents a cycloalkyl group, it is preferable that the other represents a hydrogen atom.

It is preferable that the repeating unit represented by Formula (I-b) is a repeating unit represented by Formula (I-c).

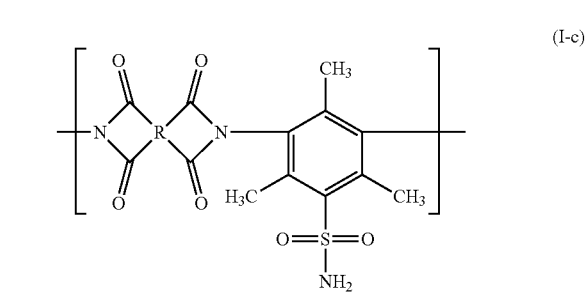

(I-c)

In Formula (I-c), R has the same definition as that for R in Formula (I-b) and the preferable forms are the same as each other.

The polyimide compound used in the present invention may have a repeating unit represented by Formula (II-a) or (II-b) in addition to the repeating unit represented by Formula (I).

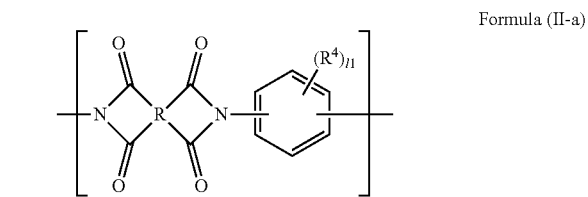

Formula (II-a)

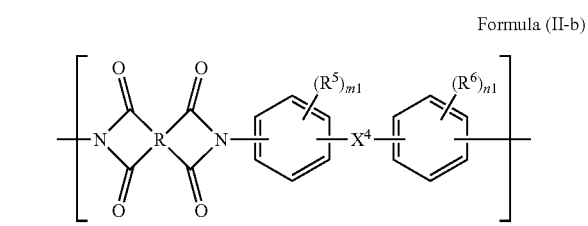

Formula (II-b)

In Formulae (II-a) and (II-b), R has the same definition as that for R in Formula (I) and the preferable ranges are the same as each other. $R^4$ to $R^6$ each independently represent a substituent. Examples of the substituent include groups selected from the group Z of substituents described below.

It is preferable that $R^4$ represents an alkyl group, a carboxy group, or a halogen atom. l1 showing the number of $R^4$'s represents an integer of 0 to 4. In a case where $R^4$ represents an alkyl group, l1 represents preferably 1 to 4, more preferably 2 to 4, and still more preferably 3 or 4. In a case where $R^4$ represents a carboxy group, l1 represents preferably 1 or 2 and more preferably 1. In a case where $R^4$ represents alkyl, the number of carbon atoms in alkyl groups is preferably in a range of 1 to 10, more preferably in a range of 1 to 5, and still more preferably in a range of 1 to 3. It is particularly preferable that the alkyl group is methyl, ethyl, or trifluoromethyl.

In Formula (II-a), it is preferable that both of two linking sites for being incorporated in the polyimide compound of the diamine component (that is, a phenylene group which can contain $R^4$) are positioned in the meta position or the para position and more preferable that both of two linking sites are positioned in the para position.

In the present invention, the repeating unit represented by formula (II-a) does not include the repeating unit represented by Formula (I).

It is preferable that $R^5$ and $R^6$ represent an alkyl group or a halogen atom or represent a group that forms a ring together with $X^4$ by being linked to each other. Further, the form of two $R^5$'s being linked to each other to form a ring or the form of two $R^6$'s being linked to each other to form a ring is preferable. The bond formed by $R^5$ and $R^6$ being linked to each other is not particularly limited, but a single bond, —O—, or —S— is preferable. m1 showing the number of $R^5$'s and n1 showing the number of $R^6$'s each independently represent an integer of 0 to 4, preferably in a range of 1 to 4, more preferably in a range of 2 to 4, and particularly preferably 3 or 4. In a case where $R^5$ and $R^6$ represent an alkyl group, the number of carbon atoms in the alkyl group is preferably in a range of 1 to 10, more preferably in a range of 1 to 5, and still more preferably in a range of 1 to 3. It is particularly preferable that the alkyl group is methyl, ethyl, or trifluoromethyl.

$X^4$ has the same definition as that for $X^1$ in Formula (I-1) and the preferable ranges are the same as each other.

In the structure of the polyimide compound used in the present invention, the ratio of the molar amount of the repeating unit represented by Formula (I) to the total molar amount of the repeating unit represented by Formula (I), the repeating unit represented by Formula (II-a), and the repeating unit represented by Formula (II-b) is preferably in a range of 50% to 100% by mole, more preferably in a range of 70% to 100% by mole, still more preferably in a range of 80% to 100% by mole, and particularly preferably in a range of 90% to 100% by mole. Further, the expression "the ratio of the molar amount of the repeating unit represented by Formula (I) to the total molar amount of the repeating unit represented by Formula (I), the repeating unit represented by Formula (II-a), and the repeating unit represented by Formula (II-b) is 100% by mole" means that the polyimide compound does not have any of the repeating unit represented by Formula (II-a) or the repeating unit represented by Formula (II-b).

It is preferable that the polyimide compound used in the present invention consists of the repeating unit represented by Formula (I) or the remainder other than the repeating unit represented by Formula (I) in a case where the polyimide compound has a repeating unit other than the repeating unit represented by Formula (I) consists of the repeating unit represented by Formula (II-a) or (II-b). Here, the concept "consists of the repeating unit represented by Formula (II-a) or (II-b)" includes three forms that are in the form consists of the repeating unit represented by Formula (II-a), the form consists of the repeating unit represented by Formula (II-b), and the form consists of the repeating unit represented by Formula (II-a) and the repeating unit represented by Formula (II-b).

Examples of the group Z of substituents include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a carboxy group, an oxo group, a nitro group, a hydroxamic acid group, a sulfino group, a hydrazine group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituents may be substituted with any one or more substituents selected from the group Z of substituents.

Further, in the present invention, in a case where a plurality of substituents are present at one structural site, these substituents may be linked to each other to form a ring or may be condensed with some or entirety of the structural site and form an aromatic ring or an unsaturated hetero ring.

In a case where a compound or a substituent includes an alkyl group or an alkenyl group, these may be linear or branched and may be substituted or unsubstituted. In addition, in a case where a compound or a substituent includes an aryl group or a heterocyclic group, these may be a single ring or a condensed ring and may be substituted or unsubstituted.

In the present specification, in a case where a group is described as only a substituent, the group Z of substituents can be used as reference unless otherwise specified. Further, in a case where only the names of the respective groups are described (for example, a group is described as an "alkyl group"), the preferable range and the specific examples of the corresponding group in the group Z of substituents are applied.

The molecular weight of the polyimide compound used in the present invention is preferably in a range of 10,000 to 1,000,000, more preferably in a range of 15,000 to 500,000, and still more preferably in a range of 20,000 to 200,000, as the weight-average molecular weight.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filling a column used for the GPC method and examples of the gel include a gel formed of a styrene-divinylbenzene copolymer. It is preferable that two to six columns are linked to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 to 2 mL/min and most preferable that the measurement is performed at a flow rate thereof of 0.5 to 1.5 mL/min. In a case where the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

(Synthesis of Polyimide Compound)

The polyimide compound used in the present invention can be synthesized by performing condensation and polymerization of a specific bifunctional acid anhydride (tetracarboxylic dianhydride) and a specific diamine. Such methods can be performed by referring to the technique described in a general book (for example, "The Latest Polyimide ~Fundamentals and Applications~" edited by Toshio Imai and Rikio Yokota, NTS Inc., Aug. 25, 2010, pp. 3 to 49) as appropriate.

At least one tetracarboxylic dianhydride serving as a raw material in synthesis of the polyimide compound used in the present invention is represented by Formula (IV). It is preferable that all tetracarboxylic dianhydrides which are the raw materials are represented by Formula (IV).

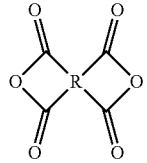

Formula (IV)

In Formula (IV), R has the same definition as that for R in Formula (I).

Specific examples of the tetracarboxylic dianhydride which can be used in the present invention include tetracarboxylic dianhydrides shown below.

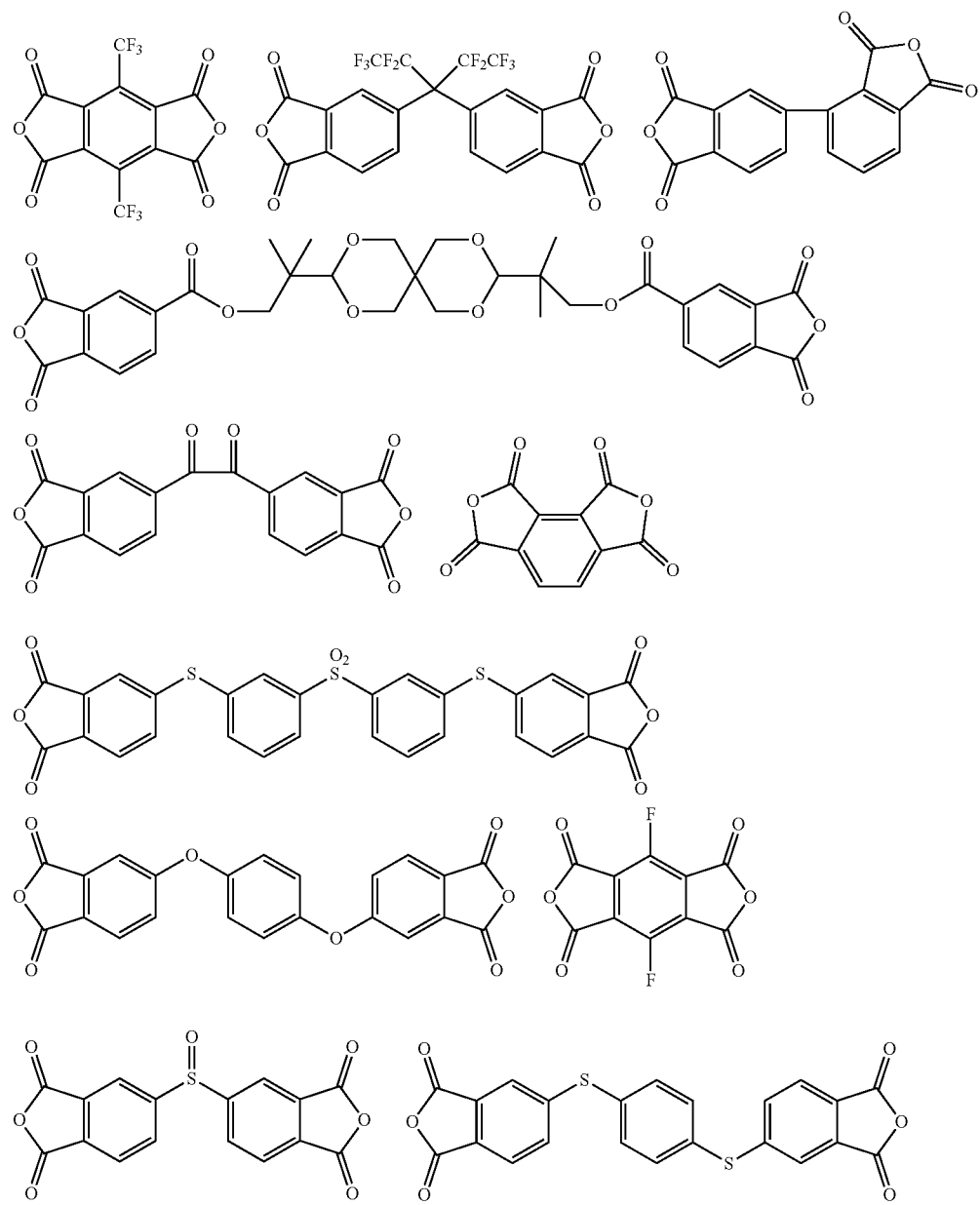

-continued
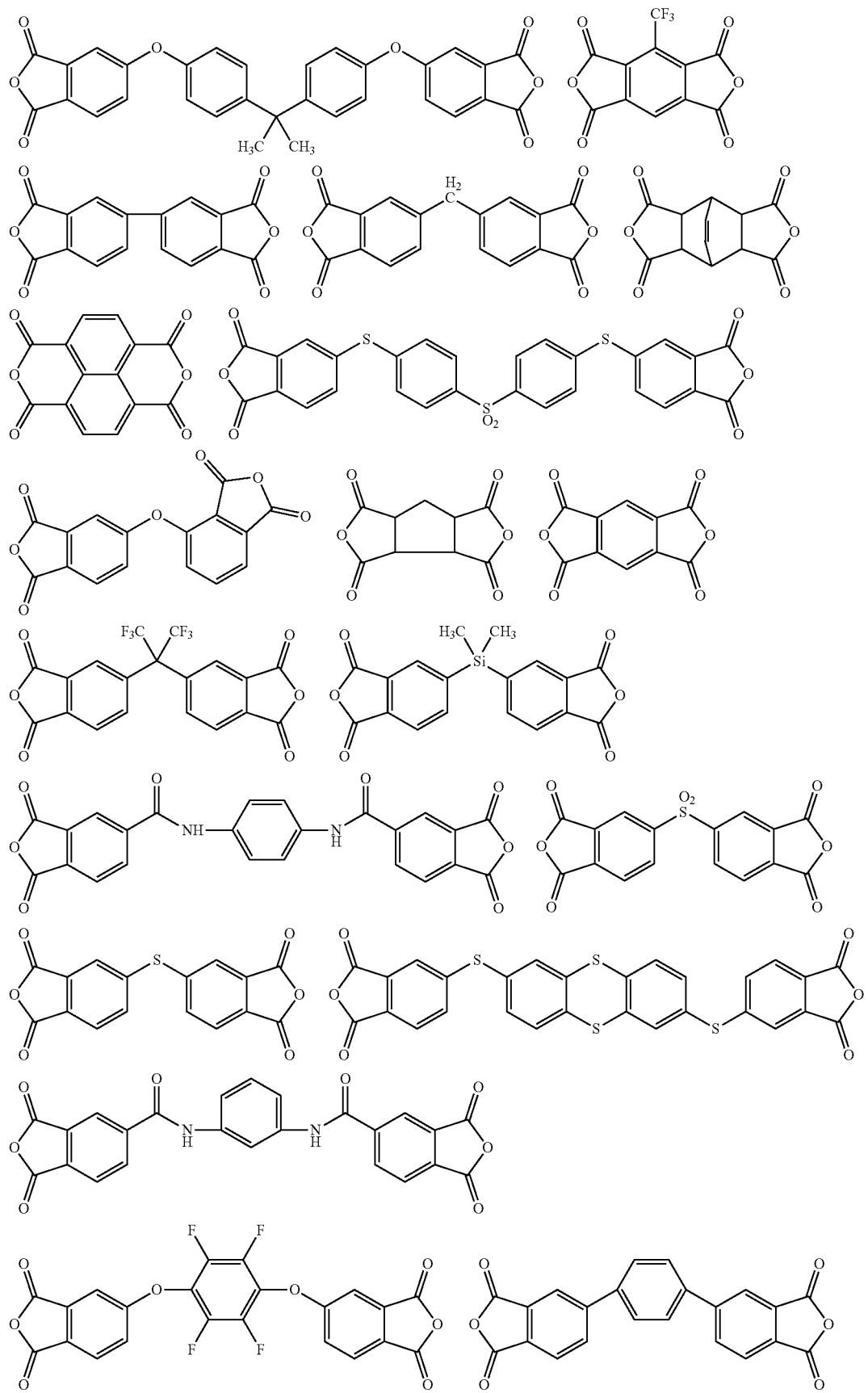

-continued
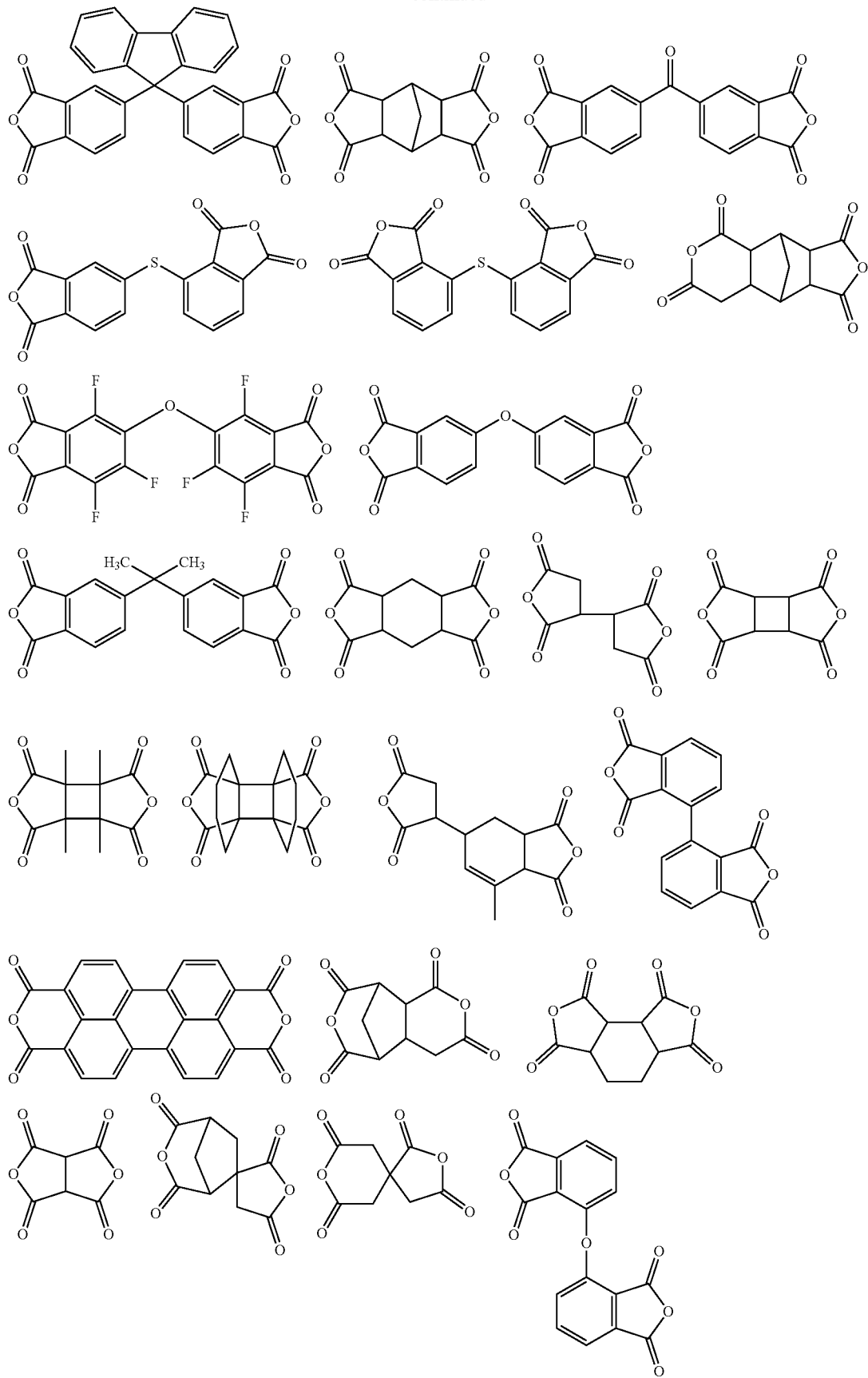

-continued
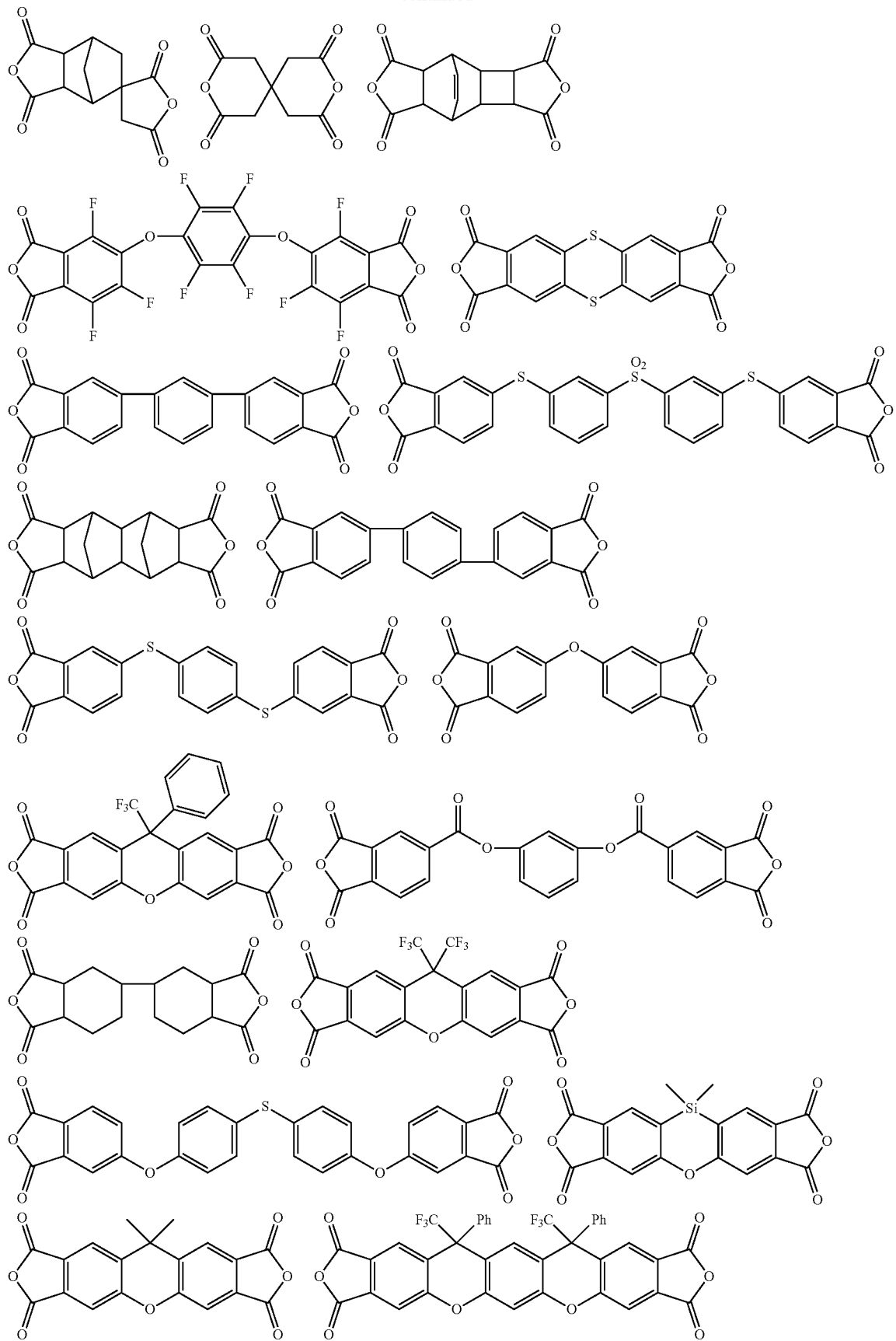

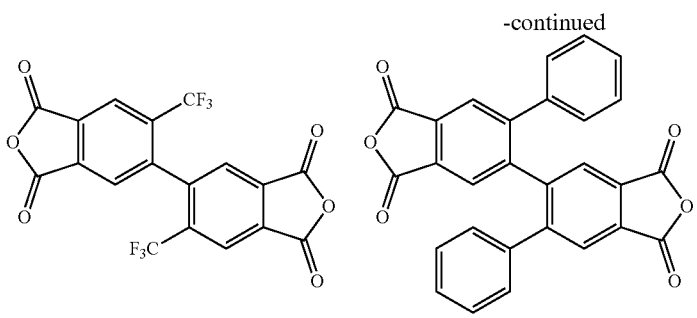

At least one diamine compound serving as the other raw material in synthesis of the polyimide compound used in the present invention is represented by Formula (V).

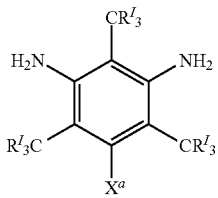

(V)

In Formula (V), $R^I$ and $X^a$ have the same definitions as those for $R^I$ and $X^a$ in Formula (I).

Specific examples of the diamine compound represented by Formula (V) include diamine compounds shown below, but the present invention is not limited to these. Further, in the present specification, Me indicates methyl and Et indicates ethyl.

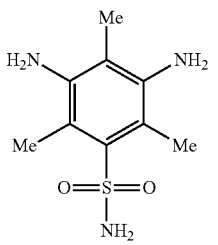
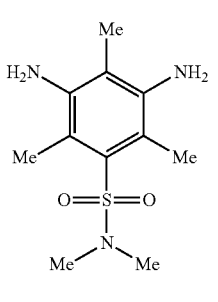
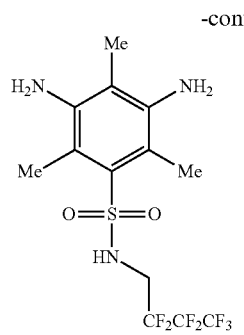
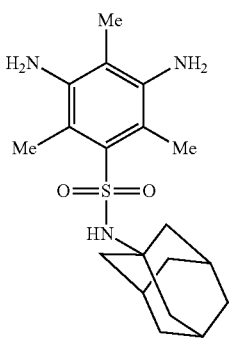
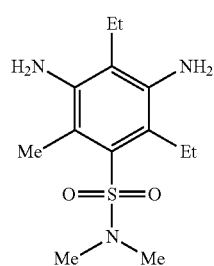
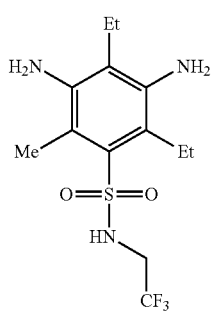
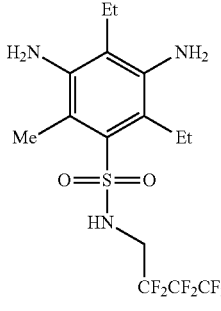
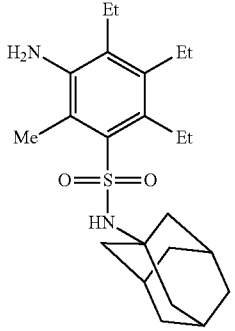

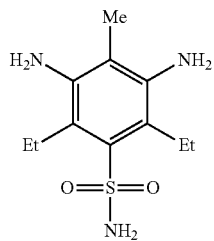 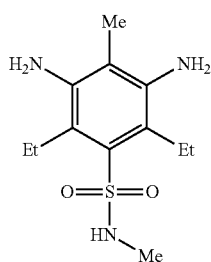 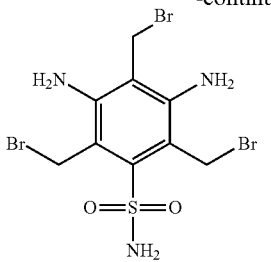 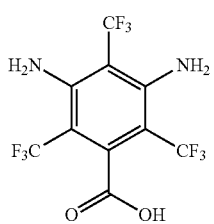

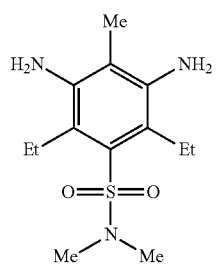 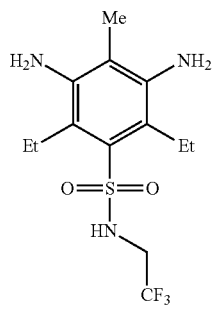

Further, in addition to the diamine compound represented by Formula (V), a diamine compound represented by Formula (VII-a) or (VII-b) may be used as the diamine compound serving as a raw material in the synthesis of the polyimide compound used in the present invention.

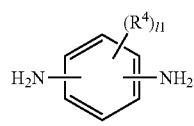

Formula (VII-a)

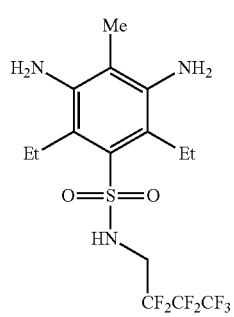 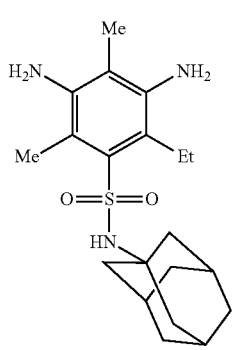

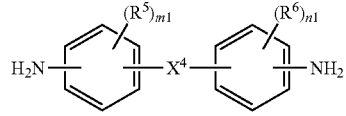

Formula (VII-b)

In Formula (VII-a), $R^4$ and 11 have the same definitions as those for $R^4$ and 11 in Formula (II-a). The diamine compound represented by Formula (VII-a) does not include the diamine compound represented by Formula (V).

In Formula (VII-b), $R^5$, $R^6$, $X^4$, m1, and n1 have the same definitions as those for $R^5$, $R^6$, $X^4$, m1, and n1 in Formula (II-b).

As the diamine compound represented by Formula (VII-a) or (VII-b), for example, diamine compounds shown below can be used.

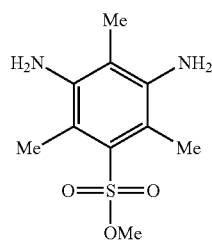 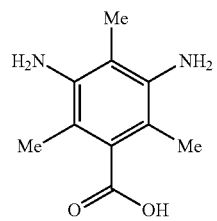

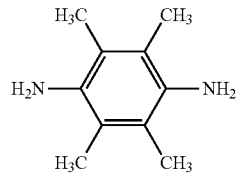

Diamine-1

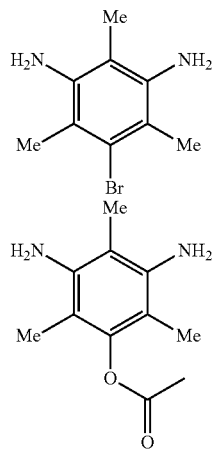 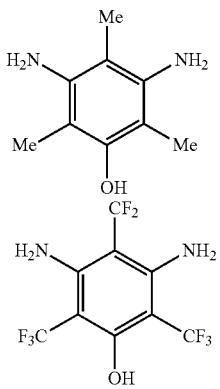

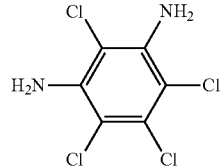

Diamine-11

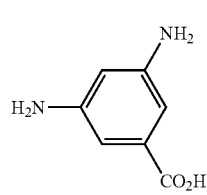

Diamine-31

-continued
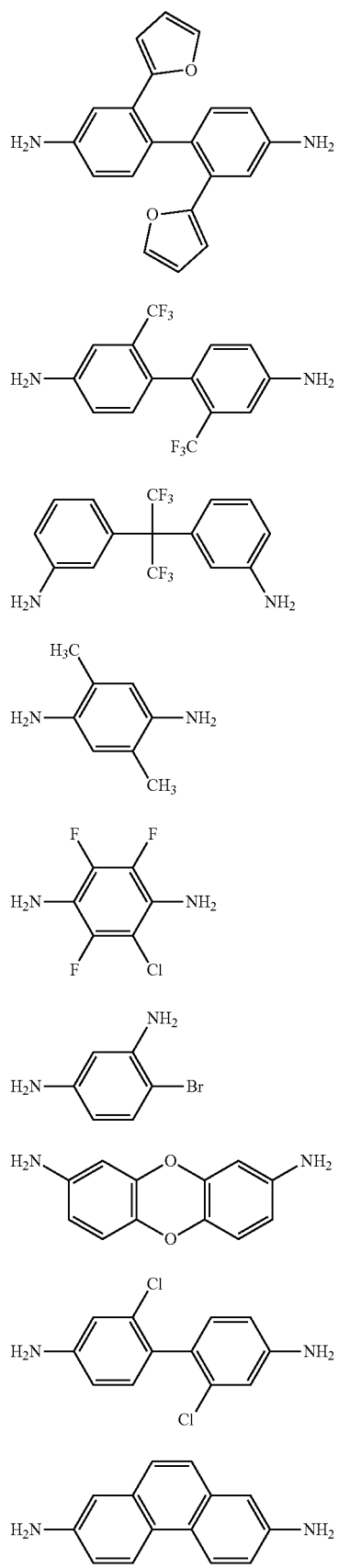
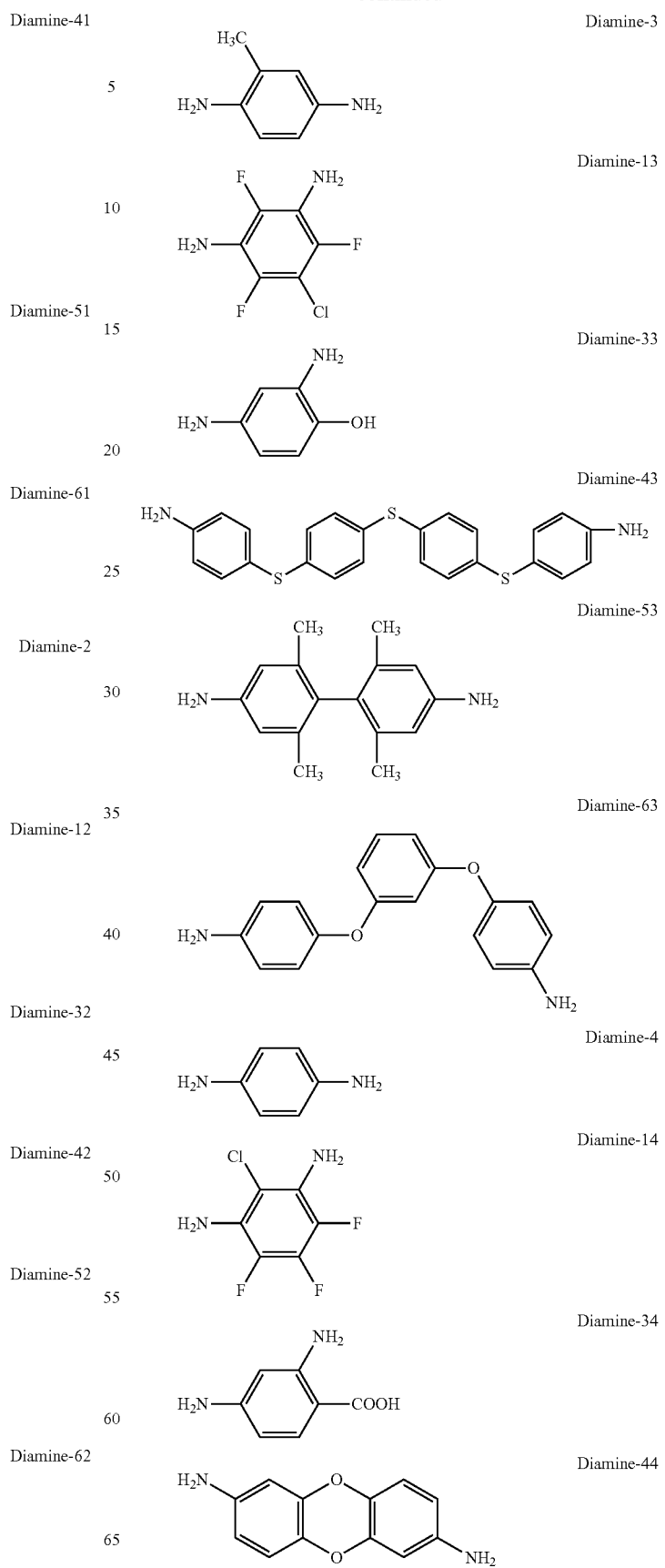

Diamine-54
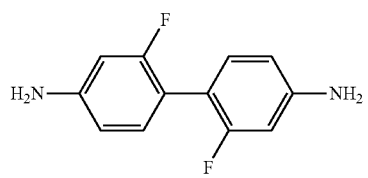
Diamine-64
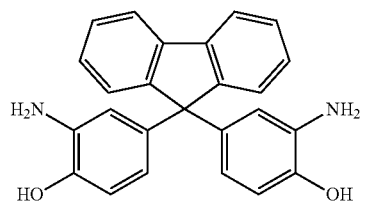
Diamine-5
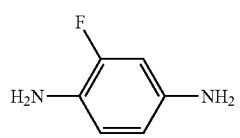
Diamine-15
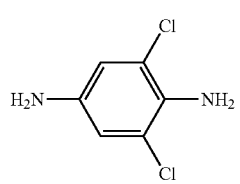
Diamine-35
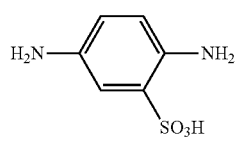
Diamine-45
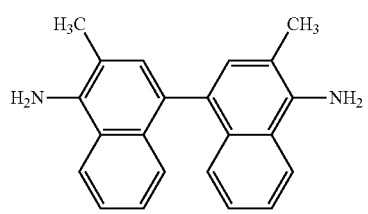
Diamine-55
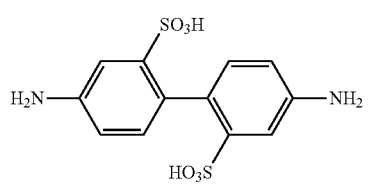
Diamine-65
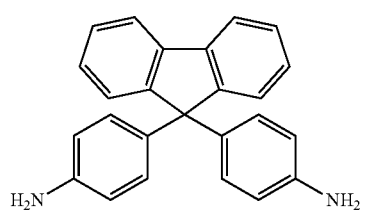
Diamine-6
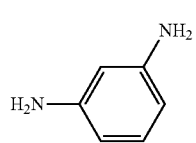
Diamine16
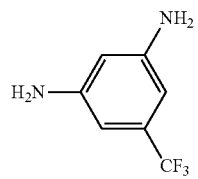
Diamine-36
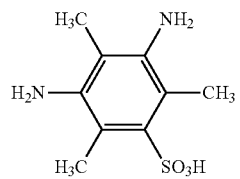
Diamine-46
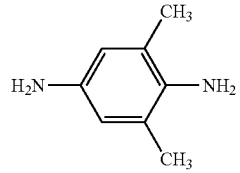
Diamine-56
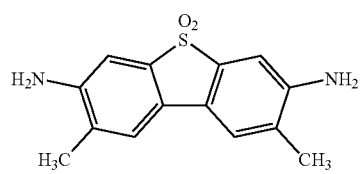
Diamine-66
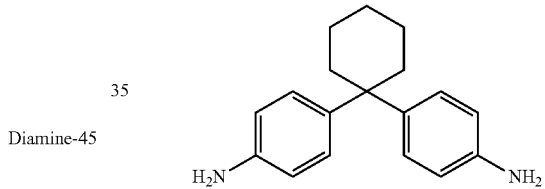
Diamine-7
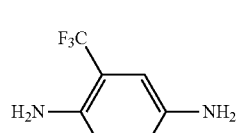
Diamine-17
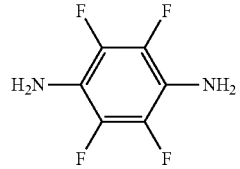
Diamine-37
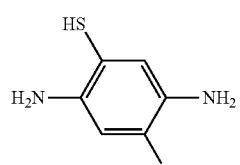
Diamine-47
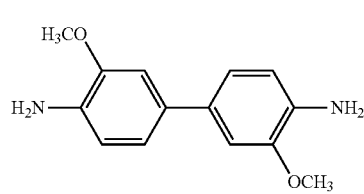

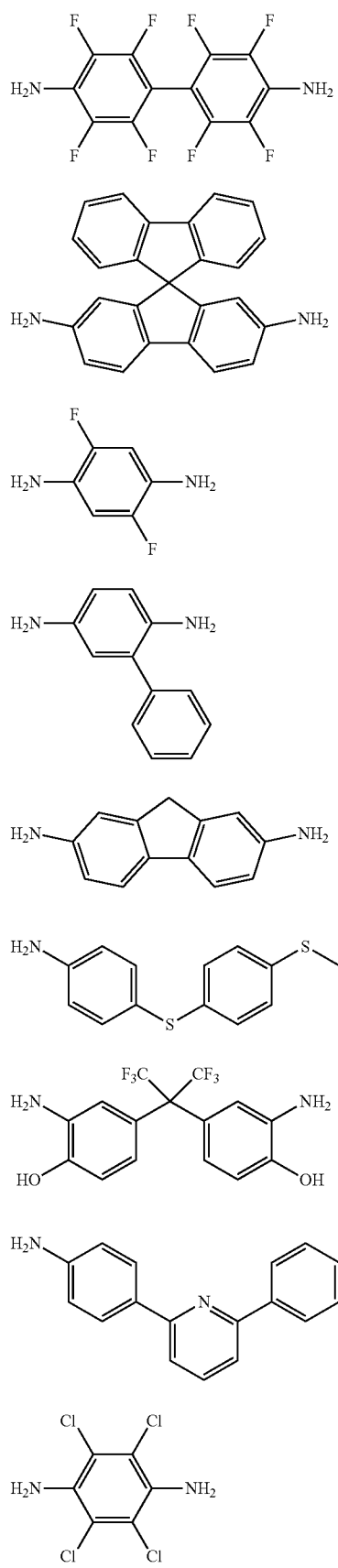
Diamine-57
Diamine-67
Diamine-8
Diamine-18
Diamine-38
Diamine-48
Diamine-58
Diamine-68
Diamine-9
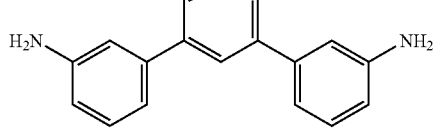
Diamine-19
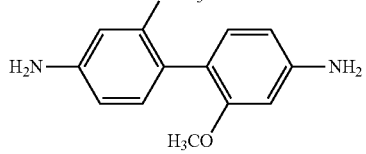
Diamine-39
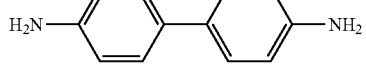
Diamine-49
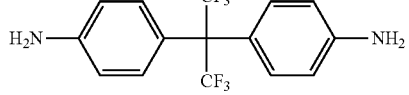
Diamine-59
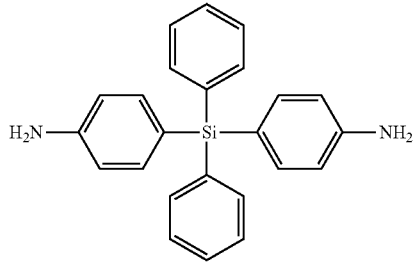
Diamine-69
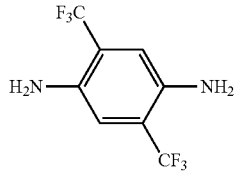
Diamine-10
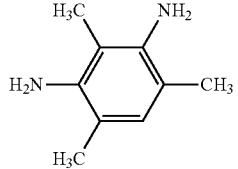
Diamine-20
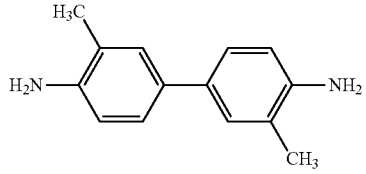
Diamine-40
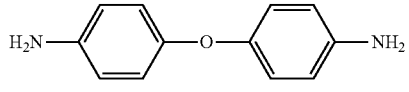
Diamine-50
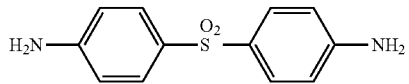
Diamine-60

-continued

Diamine-70

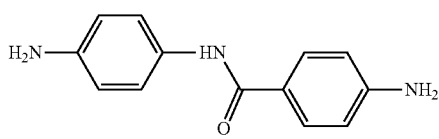

The tetracarboxylic dianhydride represented by Formula (IV) and the diamine compound represented by Formula (V), (VII-a), or (VII-b) may be used as oligomers or prepolymers in advance. The polyimide compound used in the present invention may be any of a block copolymer, a random copolymer, and a graft copolymer.

The polyimide compound used in the present invention can be obtained by mixing the above-described raw materials in a solvent and condensing and polymerizing the mixture using a typical method as described above.

The solvent is not particularly limited, and examples thereof include an ester-based organic solvent such as methyl acetate, ethyl acetate, or butyl acetate; an aliphatic ketone-based organic solvent such as acetone, methyl ethyl ketone, methyl isobutyl ketone, diacetone alcohol, cyclopentanone, or cyclohexanone; an ether-based organic solvent such as ethylene glycol dimethyl ether, diethylene glycol monomethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected within the range in which a tetracarboxylic dianhydride serving as a reaction substrate, a diamine compound, polyamic acid which is a reaction intermediate, and a polyimide compound which is a final product can be dissolved. Among these, an ester-based organic solvent (preferably butyl acetate), an aliphatic ketone-based organic solvent (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent (preferably N-methylpyrrolidone), or a sulfur-containing organic solvent (dimethyl sulfoxide or sulfolane) is preferable. In addition, these can be used alone or in combination of two or more kinds thereof.

The temperature of the polymerization reaction is not particularly limited and a temperature which can be typically employed for the synthesis of the polyimide compound can be employed. Specifically, the temperature is preferably in a range of −40° C. to 60° C. and more preferably in a range of −30° C. to 50° C.

The polyimide compound can be obtained by imidizing the polyamic acid, which is generated by the above-described polymerization reaction, through a dehydration ring-closure reaction in a molecule. The method of the dehydration ring-closure can be performed by referring to the method described in a general book (for example, "The Latest Polyimide Fundamentals and Applications" edited by Toshio Imai and Rikio Yokota, NTS Inc., Aug. 25, 2010, pp. 3 to 49). A thermal imidization method of performing heating in a temperature range of 120° C. to 200° C. and removing water generated as a by-product to the outside of the system for a reaction or a so-called chemical imidization method in which a dehydration condensation agent such as an acetic anhydride, dicyclohexylcarbodiimide, or triphenyl phosphite is used in the coexistence of a basic catalyst such as pyridine, triethylamine, or DBU is suitably used.

After the synthesis of the polyimide compound, it is possible to convert a $CR^I_3$ group. For example, it is possible to convert a $CH_3$ group into a $CH_2Br$ group or to allow a $CH_3$ group to react with a crosslinking agent as shown in the following scheme.

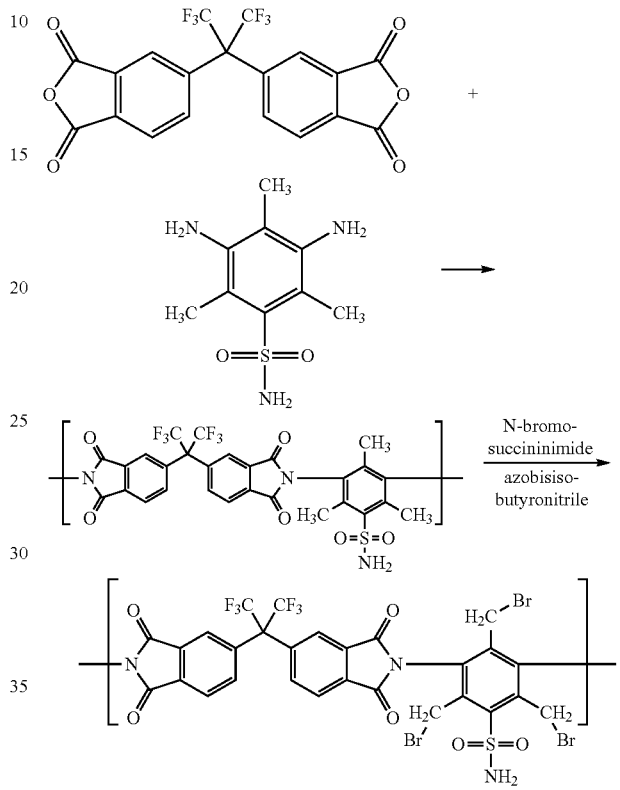

In the present invention, the total concentration of the tetracarboxylic dianhydride and the diamine compound in the polymerization reaction solution of the polyimide compound is not particularly limited, but is preferably in a range of 5% to 70% by mass, more preferably in a range of 5% to 50% by mass, and still more preferably in a range of 5% to 30% by mass.

[Gas Separation Membrane]

(Gas Separation Composite Membrane)

The gas separation composite membrane (hereinafter, also referred to as a "composite membrane") which is a preferable form of the gas separation membrane of the present invention includes a gas permeating support layer and a gas separation layer formed to contain a specific polyimide compound on the upper side of the support layer. It is preferable that the composite membrane is formed by coating (doping) at least a surface of a porous support with a coating solution that forms the gas separation layer. In the present specification, the concept "coating" includes the form of adhesion to a surface through immersion.

Figure 2:
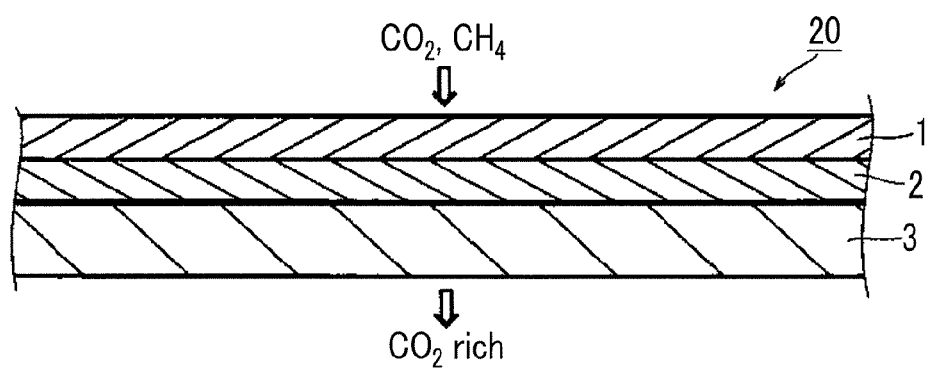
FIG. 2 is a cross-sectional view schematically illustrating another embodiment of the gas separation composite membrane according to the present invention.

FIG. 1 is a cross-sectional view schematically illustrating a gas separation composite membrane 10 which is a preferred embodiment of the present invention. The gas separation composite membrane 10 includes a gas separation layer 1 and a support layer formed of a porous layer 2. FIG. 2 is a cross-sectional view schematically illustrating a gas separation composite membrane 20 which is a preferred embodiment of the present invention. In the embodiment, a non-woven fabric layer 3 is added as a support layer in addition to the gas separation layer 1 and the porous layer 2.

FIGS. 1 and 2 illustrate the form of making permeating gas to be rich in carbon dioxide by selective permeation of carbon dioxide from mixed gas of carbon dioxide and methane.

The expression "on the upper side of the support layer" in the present specification means that another layer may be interposed between the support layer and the gas separation layer. Further, in regard to the expressions related to up and down, the side where gas to be separated is supplied is set as "up" and the side where the separated gas is discharged is set as "down" unless otherwise specified.

The gas separation composite membrane of the present invention may be obtained by forming or disposing a gas separation layer on a surface or internal surface of the porous support (support layer) or can be obtained by simply forming a gas separation layer on at least a surface thereof to form a composite membrane. By forming a gas separation layer on at least a surface of the porous support, a composite membrane with an advantage of having excellent gas separation selectivity, excellent gas permeability, and mechanical strength can be obtained. As the membrane thickness of the gas separation layer, it is preferable that the gas separation layer is as thin as possible under conditions of imparting excellent gas permeability while maintaining the mechanical strength and the gas separation selectivity.

In the gas separation composite membrane of the present invention, the thickness of the gas separation layer is not particularly limited, but is preferably in a range of 0.01 to 5.0 μm and more preferably in a range of 0.05 to 2.0 μm.

The porous support (porous layer) which is preferably applied to the support layer is not particularly limited as long as the mechanical strength and the excellent gas permeability can be imparted, and the porous support may be formed of either of an organic material and an inorganic material. Among these, a porous membrane formed of an organic polymer is preferable. The thickness of the porous layer is in a range of 1 to 3000 μm, preferably in a range of 5 to 500 μm, and more preferably in a range of 5 to 150 μm. The pore structure of this porous layer has an average pore diameter of typically 10 μm or less, preferably 0.5 μm or less, and more preferably 0.2 μm or less. The porosity is preferably in a range of 20% to 90% and more preferably in a range of 30% to 80%.

Here, the support layer having the "gas permeability" means that the permeation rate of carbon dioxide is $1 \times 10^{-5}$ cm$^3$ (STP)/cm$^2$·sec·cmHg (10 GPU) or greater in a case where carbon dioxide is supplied to the support layer (membrane formed of only the support layer) by setting the temperature to 40° C. and the total pressure on the side to which gas is supplied to 4 MPa. Further, in regard to the gas permeability of the support layer, the permeation rate of carbon dioxide is preferably $3 \times 10^{-5}$ cm$^3$ (STP)/cm$^2$·sec·cmHg (30 GPU) or greater, more preferably 100 GPU or greater, and still more preferably 200 GPU or greater in a case where carbon dioxide is supplied by setting the temperature to 40° C. and the total pressure on the side to which gas is supplied to 4 MPa. Examples of the material of the porous layer include conventionally known polymers, for example, a polyolefin-based resin such as polyethylene or polypropylene; a fluorine-containing resin such as polytetrafluoroethylene, polyvinyl fluoride, or polyvinylidene fluoride; and various resins such as polystyrene, cellulose acetate, polyurethane, polyacrylonitrile, polyphenylene oxide, polysulfone, polyether sulfone, polyimide, and polyaramid. As the shape of the porous layer, any shape from among a flat plate shape, a spiral shape, a tabular shape, and a hollow fiber shape can be employed.

In the gas separation composite membrane of the present invention, it is preferable that a support is formed in the lower portion of the support layer that forms the gas separation layer for imparting mechanical strength. Examples of such a support include woven fabric, non-woven fabric, and a net. Among these, from the viewpoints of membrane forming properties and the cost, non-woven fabric is suitably used. That is, it is preferable that the support layer includes a non-woven fabric layer and a porous layer in this order. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a dryer. Moreover, for the purpose of removing a nap or improving mechanical properties, it is preferable that thermal pressing processing is performed on the non-woven fabric by interposing the non-woven fabric between two rolls.

<Method of Producing Gas Separation Composite Membrane>

As a method of producing the composite membrane of the present invention, a production method which includes coating a support layer with a coating solution containing the above-described polyimide compound to form a gas separation layer is preferable. The content of the polyimide compound in the coating solution is not particularly limited, but is preferably in a range of 0.1% to 30% by mass and more preferably in a range of 0.5% to 10% by mass. In a case where the content of the polyimide compound is extremely small, defects are highly likely to occur in the surface layer contributing to separation because a membrane formed on the porous support easily permeates to the underlayer at the time of membrane formation on the porous support. In addition, in a case where the content of the polyimide compound is extremely large, there is a possibility that the gas permeability is degraded because holes are filled with the material of a membrane formed on the porous support at a high concentration at the time of membrane formation on the porous support. The gas separation membrane of the present invention can be appropriately produced by adjusting the molecular weight of the polymer, the structure, and the composition of the gas separation layer and the viscosity of the solution.

—Organic Solvent—

The organic solvent serving as a medium of the coating solution is not particularly limited, and examples thereof include a hydrocarbon-based organic solvent such as n-hexane or n-heptane; an ester-based organic solvent such as methyl acetate, ethyl acetate, or butyl acetate; an alcohol-based organic solvent such as methanol, ethanol, n-propanol, isopropanol, n-butanol, isobutanol, or tert-butanol; an aliphatic ketone-based organic solvent such as acetone, methyl ethyl ketone, methyl isobutyl ketone, diacetone alcohol, cyclopentanone, or cyclohexanone; an ether-based organic solvent such as ethylene glycol, diethylene glycol, triethylene glycol, glycerin, propylene glycol, ethylene glycol monomethyl ether, ethylene glycol monoethyl ether, propylene glycol methyl ether, dipropylene glycol methyl ether, tripropylene glycol methyl ether, ethylene glycol phenyl ether, propylene glycol phenyl ether, diethylene glycol monomethyl ether, diethylene glycol monoethyl ether, diethylene glycol monobutyl ether, triethylene glycol monomethyl ether, triethylene glycol monoethyl ether, dibutyl butyl ether, tetrahydrofuran, methyl cyclopentyl ether, or dioxane; and an amide-based organic solvent such as N-methylpyrrolidone, 2-pyrrolidone, dimethylformamide, dimethylimidazolidinone, dimethyl sulfoxide, or dimethyl acetamide. These organic solvents are appropriately selected within the range that does not adversely affect the support layer through erosion or the like, and an ester-based organic solvent (preferably butyl acetate), an alcohol-based organic solvent (preferably methanol, ethanol, isopropanol, or isobutanol), an aliphatic ketone-based organic solvent (preferably methyl ethyl ketone, methyl isobutyl ketone, diacetone alcohol, cyclopentanone, or cyclohexanone), and an ether-based organic solvent (ethylene glycol, diethylene glycol monomethyl ether, or methyl cyclopentyl ether) are preferable and an aliphatic ketone-based organic solvent, an alcohol-based organic solvent, and an ether-based organic solvent are more preferable. Further, these may be used alone or in combination of two or more kinds thereof.

<Another Layer Between Support Layer and Gas Separation Layer>

In the gas separation composite membrane of the present invention, another layer may be present between the support layer and the gas separation layer. Preferred examples of another layer include a siloxane compound layer (smooth layer). By providing a siloxane compound layer, unevenness of the outermost surface of the support layer can be made to be smooth and the thickness of the gas separation layer is easily reduced. Examples of a siloxane compound that forms the siloxane compound layer include a siloxane compound in which the main chain is formed of polysiloxane and a compound having a siloxane structure and a non-siloxane structure in the main chain.

The "siloxane compound" in the present specification indicates an organopolysiloxane compound unless otherwise noted.

—Siloxane Compound Whose Main Chain is Formed of Polysiloxane—

As the siloxane compound which can be used for the siloxane compound layer and whose main chain is formed of polysiloxane, one or two or more kinds of organopolysiloxanes represented by Formula (1) or (2) may be exemplified. Further, these organopolysiloxanes may form a crosslinking reactant. As the crosslinking reactant, a compound in the form of the compound represented by Formula (1) being cross-linked by a polysiloxane compound having groups linked to each other by reacting with a reactive group $X^S$ of Formula (1) at both terminals is exemplified.

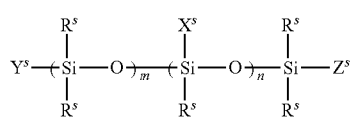

Formula (1)

In Formula (1), $R^S$ represents a non-reactive group. Specifically, it is preferable that $R^S$ represents an alkyl group (an alkyl group having preferably 1 to 18 carbon atoms and more preferably 1 to 12 carbon atoms) or an aryl group (an aryl group having preferably 6 to 15 carbon atoms and more preferably 6 to 12 carbon atoms; and more preferably phenyl).

$X^S$ represents a reactive group, and it is preferable that $X^S$ represents a group selected from a hydrogen atom, a halogen atom, a vinyl group, a hydroxy group, and a substituted alkyl group (an alkyl group having preferably 1 to 18 carbon atoms and more preferably 1 to 12 carbon atoms).

$Y^S$ and $Z^S$ are the same as $R^S$ or $X^S$ described above.

m represents a number of 1 or greater and preferably 1 to 100000.

n represents a number of 0 or greater and preferably 0 to 100000.

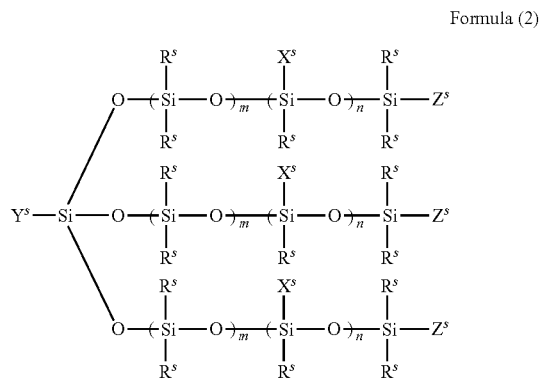

Formula (2)

In Formula (2), $X^S$, $Y^S$, $Z^S$, $R^S$, m, and n have the same definitions as those for $X^S$, $Y^S$, $Z^S$, $R^S$, m, and n in Formula (1).

In Formulae (1) and (2), in a case where the non-reactive group $R^S$ represents an alkyl group, examples of the alkyl group include methyl, ethyl, hexyl, octyl, decyl, and octadecyl. Further, in a case where the non-reactive group $R^S$ represents a fluoroalkyl group, examples of the fluoroalkyl group include $-CH_2CH_2CF_3$, and $-CH_2CH_2C_6F_{13}$.

In Formulae (1) and (2), in a case where the reactive group $X^S$ represents a substituted alkyl group, examples of the alkyl group include a hydroxyalkyl group having 1 to 18 carbon atoms, an aminoalkyl group having 1 to 18 carbon atoms, a carboxyalkyl group having 2 to 18 carbon atoms, a cycloalkyl group having 1 to 18 carbon atoms, a glycidoxyalkyl group having 4 to 18 carbon atoms, a glycidyl group, an epoxycyclohexylalkyl group having 7 to 16 carbon atoms, a (1-oxacyclobutane-3-yl)alkyl group having 4 to 18 carbon atoms, a methacryloxyalkyl group, and a mercaptoalkyl group.

The number of carbon atoms of the alkyl group constituting the hydroxyalkyl group is preferably an integer of 1 to 10, and examples of the hydroxyalkyl group include $-CH_2CH_2CH_2OH$.

The number of carbon atoms of the alkyl group constituting the aminoalkyl group is preferably an integer of 1 to 10, and examples of the aminoalkyl group include $-CH_2CH_2CH_2NH_2$.

The number of carbon atoms of the alkyl group constituting the carboxyalkyl group is preferably an integer of 1 to 10, and examples of the carboxyalkyl group include $-CH_2CH_2CH_2COOH$.

The number of carbon atoms of the alkyl group constituting the chloroalkyl group is preferably an integer of 1 to 10, and preferred examples of the chloroalkyl group include $-CH_2Cl$.

The number of carbon atoms of the alkyl group constituting the glycidoxyalkyl group is preferably an integer of 1 to 10, and preferred examples of the glycidoxyalkyl group include 3-glycidyloxypropyl.

The number of carbon atoms of the epoxycyclohexylalkyl group having 7 to 16 carbon atoms is preferably an integer of 8 to 12.

The number of carbon atoms of the (1-oxacyclobutane-3-yl)alkyl group having 4 to 18 carbon atoms is preferably an integer of 4 to 10.

The number of carbon atoms of the alkyl group constituting the methacryloxyalkyl group is preferably an integer of 1 to 10, and examples of the methacryloxyalkyl group include —$CH_2CH_2CH_2$—OOC—C($CH_3$)=$CH_2$.

The number of carbon atoms of the alkyl group constituting the mercaptoalkyl group is preferably an integer of 1 to 10, and examples of the mercaptoalkyl group include —$CH_2CH_2CH_2SH$.

It is preferable that m and n represent a number in which the molecular weight of the compound is in a range of 5000 to 1000000.

In Formulae (1) and (2), distribution of a reactive group-containing siloxane unit (in the formulae, a constitutional unit whose number is represented by n) and a siloxane unit (in the formulae, a constitutional unit whose number is represented by m) which does not have a reactive group is not particularly limited. That is, in Formulae (1) and (2), the (Si($R^S$)($R^S$)—O) unit and the (Si($R^S$)($X^S$)—O) unit may be randomly distributed.

—Compound Having Siloxane Structure and Non-Siloxane Structure in Main Chain—

Examples of the compound which can be used for the siloxane compound layer and has a siloxane structure and a non-siloxane structure in the main chain include compounds represented by Formulae (3) to (7).

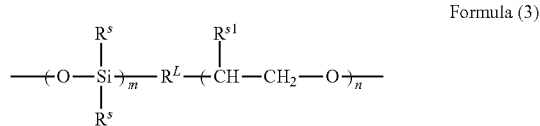

Formula (3)

In Formula (3), $R^S$, m, and n have the same definitions as those for $R^S$, m, and n in Formula (1). $R^L$ represents —O— or —$CH_2$— and $R^{S1}$ represents a hydrogen atom or methyl. It is preferable that both terminals of Formula (3) are formed of an amino group, a hydroxy group, a carboxy group, a trimethylsilyl group, an epoxy group, a vinyl group, a hydrogen atom, or a substituted alkyl group.

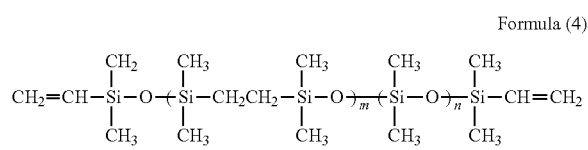

Formula (4)

In Formula (4), m and n have the same definitions as those for m and n in Formula (1).

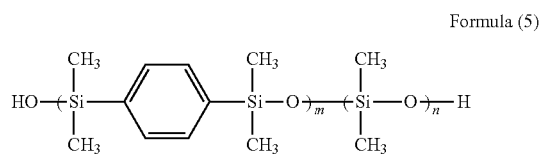

Formula (5)

In Formula (5), m and n have the same definitions as those form and n in Formula (1).

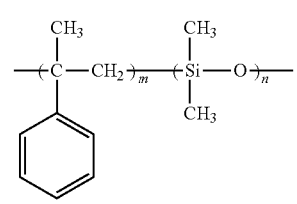

Formula (6)

In Formula (6), m and n have the same definitions as those form and n in Formula (1). It is preferable that both terminals of Formula (6) are bonded to an amino group, a hydroxy group, a carboxy group, a trimethylsilyl group, an epoxy group, a vinyl group, a hydrogen atom, or a substituted alkyl group.

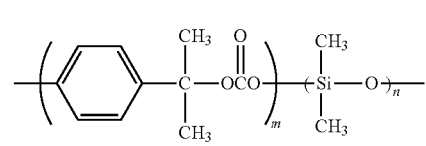

Formula (7)

In Formula (7), m and n have the same definitions as those form and n in Formula (1). It is preferable that both terminals of Formula (7) are bonded to an amino group, a hydroxy group, a carboxy group, a trimethylsilyl group, an epoxy group, a vinyl group, a hydrogen atom, or a substituted alkyl group.

In Formulae (3) to (7), distribution of a siloxane structural unit and a non-siloxane structural unit may be randomly distributed.

It is preferable that the compound having a siloxane structure and a non-siloxane structure in the main chain contains 50% by mole or greater of the siloxane structural unit and more preferable that the compound contains 70% by mole or greater of the siloxane structural unit with respect to the total molar amount of all repeating structural units.

From the viewpoint of achieving the balance between durability and reduction in membrane thickness, the weight-average molecular weight of the siloxane compound used for the siloxane compound layer is preferably in a range of 5000 to 1000000. The method of measuring the weight-average molecular weight is as described above.

Further, preferred examples of the siloxane compound constituting the siloxane compound layer are as follows.

Preferred examples thereof include one or two or more selected from polydimethylsiloxane, polymethylphenylsiloxane, polydiphenylsiloxane, a polysulfone-polyhydroxystyrene-polydimethylsoxane copolymer, a dimethylsiloxane-methylvinylsiloxane copolymer, a dimethylsiloxane-diphenylsiloxane-methylvinylsoxane copolymer, a methyl-3,3,3-trifluoropropylsiloxane-methylvinylsiloxane copolymer, a dimethylsiloxane-methylphenylsiloxane-methylvinylsiloxane copolymer, a vinyl terminated diphenylsiloxane-dimethylsiloxane copolymer, vinyl terminated polydimethylsiloxane, H terminated polydimethylsiloxane, and a dimethylsiloxane-methylhydroxysiloxane copolymer. Further, these include the forms of forming crosslinking reactants.

In the composite membrane of the present invention, from the viewpoints of smoothness and gas permeability, the thickness of the siloxane compound layer is preferably in a range of 0.01 to 5 µm and more preferably in a range of 0.05 to 1 µm.

Further, the gas permeability of the siloxane compound layer at 40° C. and 4 MPa is preferably 100 GPU or greater, more preferably 300 GPU or greater, and still more preferably 1000 GPU or greater in terms of the permeation rate of carbon dioxide.

(Gas Separation Asymmetric Membrane)

The gas separation membrane of the present invention may be an asymmetric membrane. The asymmetric membrane can be formed according to a phase inversion method using a solution containing a polyimide compound. The phase inversion method is a known method of allowing a polymer solution to be brought into contact with a coagulating liquid for phase inversion to form a membrane, and a so-called dry-wet method is suitably used in the present invention. The dry-wet method is a method of forming a porous layer by evaporating a solution on the surface of a polymer solution which is made to have a membrane shape to form a thin compact layer, immersing the compact layer in a coagulating liquid (a solvent which is compatible with a solvent of a polymer solution and in which a polymer is insoluble), and forming fine pores using a phase separation phenomenon that occurs at this time, and this method is suggested by Loeb and Sourirajan (for example, the specification of U.S. Pat. No. 3,133,132A).

In the gas separation asymmetric membrane of the present invention, the thickness of the surface layer contributing to gas separation, which is referred to as a compact layer or a skin layer, is not particularly limited, but is preferably in a range of 0.01 to 5.0 μm and more preferably in a range of 0.05 to 1.0 μm from the viewpoint of imparting practical gas permeability. In addition, the porous layer positioned in the lower portion of the compact layer plays a role of decreasing gas permeability resistance and imparting the mechanical strength at the same time, and the thickness thereof is not particularly limited as long as self-supporting properties as an asymmetric membrane are imparted, but is preferably in a range of 5 to 500 μm, more preferably in a range of 5 to 200 μm, and still more preferably in a range of 5 to 100

The gas separation asymmetric membrane of the present invention may be a flat membrane or a hollow fiber membrane. An asymmetric hollow fiber membrane can be produced by a dry-wet spinning method. The dry-wet spinning method is a method of producing an asymmetric hollow fiber membrane by applying a dry-wet method to a polymer solution which is discharged from a spinning nozzle in a target shape which is a hollow fiber shape. More specifically, the dry-wet spinning method is a method in which a polymer solution is discharged from a nozzle in a target shape which is a hollow fiber shape, passes through air or a nitrogen gas atmosphere immediately after the discharge, and is immersed in a coagulating liquid to form an asymmetric structure. Thereafter, the asymmetric structure is dried and subjected to a heat treatment as necessary, thereby producing a separation membrane. In addition, the coagulating liquid does not substantially dissolve a polymer and is compatible with a solvent of the polymer solution.

The solution viscosity of the solution containing a polyimide compound which is discharged from a nozzle is in a range of 2 to 17000 Pa·s, preferably 10 to 1500 Pa·s, and particularly preferably in a range of 20 to 1000 Pa·s at the discharge temperature (for example, 10° C.) from a viewpoint of stably obtaining the shape after the discharge such as a hollow fiber shape or the like. It is preferable that immersion of a membrane in a coagulating liquid is carried out by immersing the membrane in a primary coagulating liquid to be solidified to the extent that the shape of a membrane such as a hollow fiber shape can be maintained, winding the membrane around a guide roll, immersing the membrane in a secondary coagulating liquid, and sufficiently solidifying the whole membrane. It is effective that the solidified membrane is dried after the coagulating liquid is substituted with a solvent such as hydrocarbon. It is preferable that the heat treatment for drying the membrane is performed at a temperature lower than the softening point or the secondary transition point of the used polyimide compound.

<Protective Layer on Upper Side of Gas Separation Layer>

The gas separation membrane of the present invention may be provided with a siloxane compound layer in contact with the gas separation layer as a protective layer on the gas separation layer.

It is preferable that the Si ratio of the siloxane compound layer before and after being immersed in chloroform represented by Equation (I) is in a range of 0.6 to 1.0.

Si ratio=(Si-Kα X-ray intensity after immersion in chloroform)/(Si-Kα X-ray intensity before immersion in chloroform)   Equation (I)

The Si ratio is calculated by immersing the siloxane compound layer in chloroform at 25° C. for 12 hours, irradiating the surface of the siloxane compound layer with X-rays before and after the immersion, and measuring the intensity of a peak (2θ=144.6 deg) of the Si-Kα X-ray (1.74 keV). The method of measuring the Si-Kα X-ray intensity is described in JP1994-88792A (JP-H06-88792A). In a case where the Si-Kα X-ray intensity is decreased due to the immersion of the siloxane compound layer in chloroform compared to the Si-Kα X-ray intensity before the immersion, this means that low-molecular weight components are present and these low-molecular weight components are eluted. Therefore, this means that a polymer constituting the siloxane compound layer is more polymerized and thus unlikely to be eluted in chloroform as the degree of a decrease in Si-Kα X-ray intensity is smaller after the immersion of the siloxane compound layer in chloroform.

In a case where the Si ratio of the siloxane compound layer is in a range of 0.6 to 1.0, the siloxane compound can be allowed to be homogeneously present in the layer with a high density, membrane defects can be effectively prevented, and the gas separation performance can be more improved. Further, the gas separation layer can be used under conditions of a high temperature, a high pressure, and a high humidity and the plasticization of the gas separation layer due to the impurity components such as toluene can be suppressed.

The Si ratio of the siloxane compound layer in the present invention is preferably in a range of 0.7 to 1.0, more preferably in a range of 0.75 to 1.0, still more preferably in a range of 0.8 to 1.0, and particularly preferably in a range of 0.85 to 1.0.

It is preferable that the siloxane compound layer of the present invention has a structure formed by siloxane compounds being linked to each other through a linking group selected from *—O-M-O—*, *—S-M-S—*, *—NR$^a$C(=O)—*, *—NR$^b$C(=O)NR$^b$—*, *—O—CH$_2$—O—*, *—S—CH$_2$CH$_2$—*, *—OC(=O)O—*, *—CH(OH)CH$_2$OCO—*, *—CH(OH)CH$_2$O—*, *—CH(OH)CH$_2$S—*, *—CH(OH)CH$_2$NR$^c$—*, *—CH(CH$_2$OH)CH$_2$OCO—*, *—CH(CH$_2$OH)CH$_2$O—*, *—CH(CH$_2$OH)CH$_2$S—*, *—CH(CH$_2$OH)CH$_2$N(R$^c$)$_2$—*, *—CH$_2$CH$_2$—*, *—C(=O)O$^-$N$^+$(R$^d$)$_3$—*, *—SO$_3^-$N$^+$(R$^e$)$_3$—*, and *—PO$_3^-$N$^+$(R$^f$)$_3$—*.

In the formulae, M represents a divalent to tetravalent metal atom. $R^a$, $R^b$, $R^c$, $R^d$, $R^e$, and $R^f$ each independently represent a hydrogen atom or an alkyl group. The symbol * represents a linking site.

As the metal atom M, metal atoms selected from aluminum (Al), iron (Fe), beryllium (Be), gallium (Ga), vanadium (V), indium (In), titanium (Ti), zirconium (Zr), copper (Cu), cobalt (Co), nickel (Ni), zinc (Zn), calcium (Ca), magnesium (Mg), yttrium (Y), scandium (Sc), chromium (Cr), manganese (Mn), molybdenum (Mo), and boron (B) may be exemplified. Among these, metal atoms selected from Ti, In, Zr, Fe, Zn, Al, Ga, and B are preferable, metal atoms selected from Ti, In, and Al are more preferable, and Al is still more preferable.

The number of carbon atoms of the alkyl group which can be employed as $R^a$, $R^b$, $R^c$, $R^d$, $R^e$, and $R^f$ is preferably in a range of 1 to 20, more preferably in a range of 1 to 10, still more preferably in a range of 1 to 7, and particularly preferably in a range of 1 to 4. The alkyl group may be linear or branched, but is more preferably linear. Specific preferred examples of the alkyl group include methyl, ethyl, isopropyl, n-butyl, t-butyl, pentyl, hexyl, heptyl, octyl, and 1-ehtylpentyl.

In a case where the siloxane compound layer has the structure in which siloxane compounds are linked to each other through the linking group, the Si ratio of the siloxane compound layer is easily increased so as to be in the range defined by the present invention.

The reaction of linking the siloxane compounds to each other through the linking group is described below.

<*—O-M-O—*>

The linking group *—O-M-O—* can be formed by a ligand exchange reaction between a siloxane compound having a —OH group (active hydrogen-containing group) such as a hydroxy group, a carboxy group, or a sulfo group and a metal complex (crosslinking agent) represented by Formula (B).

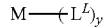

(B)

In the formula, M has the same definition as that for the metal atom M and the preferable forms are the same as each other. $L^L$ represents an alkoxy group, an aryloxy group, an acetylacetonate group, an acyloxy group, a hydroxy group, or a halogen atom. y represents an integer of 2 to 4.

The number of carbon atoms of the alkoxy group as $L^L$ is preferably in a range of 1 to 10, more preferably in a range of 1 to 4, and still more preferably in a range of 1 to 3. Specific examples of the alkoxy group as $L^L$ include methoxy, ethoxy, tert-butoxy, and isopropoxy.

The number of carbon atoms of the aryloxy group as $L^L$ is preferably in a range of 6 to 10, more preferably in a range of 6 to 8, and still more preferably 6 to 7. Specific examples of the aryloxy group as $L^L$ include phenoxy, 4-methoxyphenoxy, and naphthoxy.

The number of carbon atoms of the acyloxy group as $L^L$ is preferably in a range of 2 to 10, more preferably in a range of 2 to 6, and still more preferably in a range of 2 to 4. Specific examples of the acyloxy group as $L^L$ include acetoxy, propanoyloxy, pivaloyloxy, and acetyloxy.

The halogen atom as $L^L$ is not particularly limited and examples thereof include a fluorine atom, a chlorine atom, a bromine atom, and an iodine atom. Among these, a chlorine atom is preferable.

It is preferable that the metal complex represented by Formula (B) is soluble in the organic solvent used for the coating solution in a case where the siloxane compound layer is formed. More specifically, the solubility of the metal complex represented by Formula (B) in 100 g of tetrahydrofuran at 25° C. is preferably 0.01 to 10 g and more preferably 0.1 to 1.0 g. In a case where the metal complex represented by Formula (B) is soluble in the organic solvent, a more homogeneous metal crosslinked siloxane compound layer can be formed.

Preferred specific examples of the metal complex represented by Formula (B) include metal complexes selected from aluminum acetylacetonate, gallium acetylacetonate, indium acetylacetonate, zirconium acetylacetonate, cobalt acetylacetonate, calcium acetylacetonate, nickel acetylacetonate, zinc acetylacetonate, magnesium acetylacetonate, ferric chloride, copper (II) acetate, aluminum isopropoxide, titanium isopropoxide, boric acid, and a boron trifluoride-diethyl ether complex.

An example of the ligand exchange reaction is shown as follows. Further, the following example shows a case where a siloxane compound contains a hydroxy group, but the same ligand exchange reaction proceeds and a linking group represented by *—O-M-O—* is formed in a case where a siloxane compound contains an active hydrogen-containing group such as a carboxy group or a sulfo group.

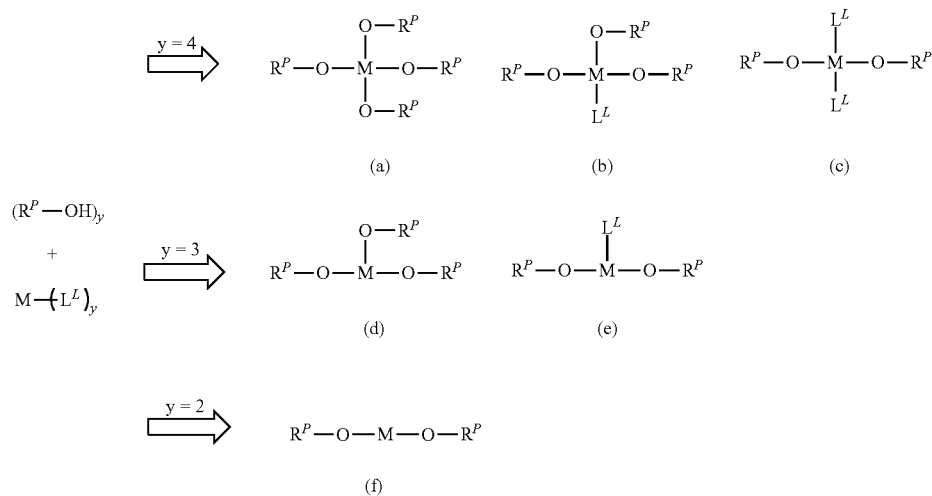

In the formulae, $R^P$ represents a siloxane compound residue (that is, $R^P$—OH represents a siloxane compound having a hydroxy group).

In a case where M represents a tetravalent metal atom (y=4), up to 4 ($R^P$—OH)'s can be usually coordinated with respect to one M (the form of (a) shown above). In the present invention, in a case where M represents a tetravalent metal atom, all of a form in which 2 ($R^P$—OH)'s are coordinated (the form of (c) shown above), a form in which 3 ($R^P$—OH)'s are coordinated (the form of (b) shown above), and a form in which 4 ($R^P$—OH)'s are coordinated (the form of (a) shown above) are included in the form having a linking group represented by Further, although not shown in the formulae above, in a case where the siloxane compound $R^P$—OH is represented by $R^{P1}$—(OH)$_h$ (in a case where $R^{P1}$ represents a siloxane compound residue and h represents an integer of 2 or greater, that is, two or more hydroxy groups are included in one molecule), two or more OH's which are present in one molecule of $R^{P1}$—(OH)$_h$ may be coordinated with one M. This form is also included in the form having a linking group represented by *—O-M-O—*.

In a case where M represents a trivalent metal atom (y=3), up to 3 ($R^P$—OH)'s can be usually coordinated with respect to one M (the form of (d) shown above). In the present invention, in a case where M represents a trivalent metal atom, all of a form in which 2 ($R^P$—OH)'s are coordinated (the form of (e) shown above) and a form in which 3 ($R^P$—OH)'s are coordinated (the form of (d) shown above) are set to be included in the form having a linking group represented by *—O-M-O—*.

Further, although not shown in the formulae above, in a case where the siloxane compound $R^P$—OH is represented by $R^{P1}$—(OH)$_h$ (in a case where $R^{P1}$ represents a siloxane compound residue and h represents an integer of 2 or greater, that is, two or more hydroxy groups are included in one molecule), two or more OH's which are present in one molecule of $R^{P1}$—(OH)$_h$ may be coordinated with one M. This form is also set to be included in the form having a linking group represented by *—O-M-O—*.

In a case where M represents a divalent metal atom (y=2), the form of (f) shown above is the form having a linking group represented by *—O-M-O—* which is defined by the present invention.

Further, although not shown in the formulae above, in a case where the siloxane compound $R^P$—OH is represented by $R^{P1}$—(OH)$_h$ (in a case where $R^{P1}$ represents a siloxane compound residue and h represents an integer of 2 or greater, that is, two or more hydroxy groups are included in one molecule), two or more OH's which are present in one molecule of $R^{P1}$—(OH)$_h$ may be coordinated with one M. This form is also included in the form having a linking group represented by *—O-M-O—*.

<*—S-M-S—*>

The linked structure "*—S-M-S—*" can be formed by a ligand exchange reaction between a siloxane compound having a thiol group and a metal complex represented by Formula (B). This reaction is obtained by replacing $R^P$—OH with $R^P$—SH in the reaction for forming *—O-M-O—* described above. Since —SH is an active hydrogen-containing group, a ligand exchange reaction can be performed as described above.

<*—NR$^a$C(=O)—*>

The linking group *—NR$^a$C(=O)—* can be formed by reacting a siloxane compound containing a carboxy group with a siloxane compound containing an amino group in the presence of a dehydration condensation agent (for example, a carbodiimide compound). This reaction can be represented by the following formula.

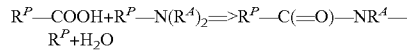

In the formula, $R^P$ represents a siloxane compound residue. One of two $R^A$'s linked to one N atom on the left side represents a hydrogen atom and the rest represents a hydrogen atom or an alkyl group (that is, $R^A$ on the right side represents a hydrogen atom or an alkyl group).

Further, the linking group can be formed by reacting a siloxane compound containing a carboxy group with a compound containing two or more amino groups serving as a crosslinking agent. Further, the linking group can be formed even by reacting a siloxane compound containing an amino group with a compound containing two or more carboxy groups serving as a crosslinking agent.

<*—NR$^b$C(=O)NR$^b$—*>

The linking group *—NR$^b$C(=O)NR$^b$—* can be formed by reacting, for example, a siloxane compound containing an amino group with chloroformate serving as a crosslinking agent. The reaction can be represented by the following formula.

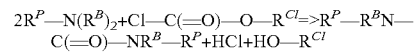

In the formula, $R^P$ represents a siloxane compound residue and $R^{Cl}$ represents an alcohol residue of chloroformate. One of two $R^B$'s linked to one N atom on the left side represents a hydrogen atom and the rest represents a hydrogen atom or an alkyl group (that is, $R^B$ on the right side represents a hydrogen atom or an alkyl group).

<*—O—CH$_2$—O—*>

The linking group *—O—CH$_2$—O—* can be formed by reacting, for example, a siloxane compound containing a hydroxy group with formaldehyde serving as a crosslinking agent. The reaction can be represented by the following formula.

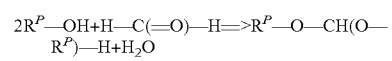

In the formula, $R^P$ represents a siloxane compound residue.

<*—S—CH$_2$CH$_2$—*>

The linking group *—S—CH$_2$CH$_2$—* can be formed by reacting, for example, a siloxane compound containing a thiol group with a siloxane compound containing a vinyl group. The reaction can be represented by the following formula.

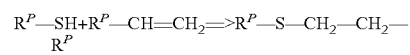

In the formula, $R^P$ represents a siloxane compound residue.

Further, the linking group can be formed even by reacting a siloxane compound containing a thiol group with a compound containing two or more vinyl groups serving as a crosslinking agent. Further, the linking group can be formed even by reacting a siloxane compound containing a vinyl group with a compound containing two or more thiol groups serving as a crosslinking agent.

<*—OC(=O)O—*>

The linking group *—OC(=O)O—* can be formed by reacting, for example, a siloxane compound containing a hydroxy group with chloroformate serving as a crosslinking agent. The reaction can be represented by the following formula.

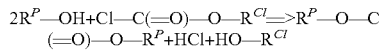

In the formula, $R^P$ represents a siloxane compound residue and $R^{Cl}$ represents an alcohol residue of chloroformate.

<*—C(=O)O⁻N⁺(R$^d$)$_3$—*>

The linking group *—C(=O)O⁻N⁺(R$^d$)$_3$—* can be formed by reacting, for example, a siloxane compound containing a carboxy group with a siloxane compound containing an amino group. The reaction can be represented by the following formula.

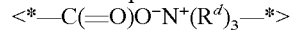

In the formula, $R^P$ represents a siloxane compound residue. $R^D$ represents a hydrogen atom or an alkyl group.

Further, the linked structure can be formed even by reacting a siloxane compound containing a carboxy group with a compound containing two or more amino groups serving as a crosslinking agent. Further, the linking group can be formed even by reacting a siloxane compound containing an amino group with a compound containing two or more carboxy groups serving as a crosslinking agent.

<*—SO$_3$⁻N⁺(R$^e$)$_3$—*>

The linking group *—SO$_3$⁻N⁺(R$^e$)$_3$—* can be formed by reacting, for example, a siloxane compound containing a sulfo group with a siloxane compound containing an amino group. The reaction can be represented by the following formula.

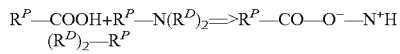

In the formula, $R^P$ represents a siloxane compound residue. $R^E$ represents a hydrogen atom or an alkyl group.

Further, the linking group can be formed even by reacting a siloxane compound containing a sulfo group with a compound containing two or more amino groups serving as a crosslinking agent. Further, the linking group can be formed even by reacting a siloxane compound containing an amino group with a compound containing two or more sulfo groups serving as a crosslinking agent.

<*—PO$_3$H⁻N⁺(R$^f$)$_3$—*>

The linked structure *—PO$_3$H⁻N⁺(R$^f$)$_3$—* can be formed by reacting, for example, a siloxane compound containing a phosphonic acid group with a siloxane compound containing an amino group. The reaction can be represented by the following formula.

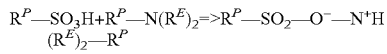

In the formula, $R^P$ represents a siloxane residue. $R^F$ represents a hydrogen atom or an alkyl group.

Further, the linking group can be formed even by reacting a siloxane compound containing a phosphonic acid group with a compound containing two or more amino groups serving as a crosslinking agent. Further, the linking group can be formed even by reacting a siloxane compound containing an amino group with a compound containing two or more sulfonic acid groups serving as a crosslinking agent.

<*—CH(OH)CH$_2$OCO—*>

The linking group *—CH(OH)CH$_2$OCO—* can be formed by reacting, for example, a siloxane compound containing an epoxy group with a siloxane compound containing a carboxy group.

Further, the linking group can be formed even by reacting a siloxane compound containing an epoxy group with a compound containing two or more carboxy groups serving as a crosslinking agent or by reacting a siloxane compound containing a carboxy group with a compound containing two or more epoxy groups serving as a crosslinking agent.

<*—CH(OH)CH$_2$O—*>

The linking group *—CH(OH)CH$_2$O—* can be formed by reacting, for example, a siloxane compound containing an epoxy group with a siloxane compound containing a hydroxy group.

Further, the linking group can be formed even by reacting a siloxane compound containing an epoxy group with a compound containing two or more hydroxy groups serving as a crosslinking agent or by reacting a siloxane compound containing a hydroxy group with a compound containing two or more epoxy groups serving as a crosslinking agent.

<*—CH(OH)CH$_2$S—*>

The linking group *—CH(OH)CH$_2$S—* can be formed by reacting, for example, a siloxane compound containing an epoxy group with a siloxane compound containing a thiol group.

Further, the linking group can be formed even by reacting a siloxane compound containing an epoxy group with a compound containing two or more thiol groups serving as a crosslinking agent or by reacting a siloxane compound containing a thiol group with a compound containing two or more epoxy groups serving as a crosslinking agent.

<*—CH(OH)CH$_2$NR$^c$—*>

The linking group *—CH(OH)CH$_2$NR$^c$—* can be formed by reacting, for example, a siloxane compound containing an epoxy group with a siloxane compound containing an amino group.

Further, the linking group can be formed even by reacting a siloxane compound containing an epoxy group with a compound containing two or more amino groups serving as a crosslinking agent or by reacting a siloxane compound containing an amino group with a compound containing two or more epoxy groups serving as a crosslinking agent.

<*—CH(CH$_2$OH)CH$_2$OCO—*>

The linking group *—CH(CH$_2$OH)CH$_2$OCO—* can be formed by replacing an epoxy group with an oxetanyl group in the formation of *—CH(OH)CH$_2$OCO—* described above.

<*—CH(CH$_2$OH)CH$_2$O—*>

The linking group *—CH(CH$_2$OH)CH$_2$O—* can be formed by replacing an epoxy group with an oxetanyl group in the formation of *—CH(OH)CH$_2$O—* described above.

<*—CH(CH$_2$OH)CH$_2$S—*>

The linking group *—CH(CH$_2$OH)CH$_2$S—* can be formed by replacing an epoxy group with an oxetanyl group in the formation of *—CH(OH)CH$_2$S—* described above.

<*—CH(CH$_2$OH)CH$_2$NR$^c$—*>

The linking group *—CH(CH$_2$OH)CH$_2$NR$^c$—* can be formed by replacing an epoxy group with an oxetanyl group in the formation of *—CH(OH)CH$_2$NR$^c$—* described above.

<*—CH$_2$CH$_2$—*>

The linking group *—CH$_2$CH$_2$—* can be formed by, for example, performing a polymerization reaction on siloxane compounds containing a vinyl group (a (meth)acryloyl group or the like).

In the present invention, structures linked through *—CH$_2$CH$_2$—* do not include structures linked through *—S—CH$_2$CH$_2$—*.

The siloxane compound layer may include one or two or more linked structures.

As the linked structure of siloxane compounds in the siloxane compound layer of the present invention, from the viewpoints of the reactivity for forming the linked structure and chemical stability of the linked structure, one or two or more structures linked through a linking group selected from *—O-M-O—*, *—S-M-S—*, *—O—CH$_2$—O—*, *—S—CH$_2$CH$_2$—*, *—OC(=O)O—*, —CH$_2$CH$_2$—*, and *—C(=O)O$^-$N$^+$(R$^d$)$_3$—* are preferable, one or two or more structures linked through a linking group selected from *—O-M-O—*, *—S-M-S—*, *—O—CH$_2$—O—*, *—S—CH$_2$CH$_2$—*, and —CH$_2$CH$_2$—* are more preferable, one or two structures linked through a linking group selected from *—O-M-O—* and *—CH$_2$CH$_2$—* are still more preferable, and linked structures consisting of both of a structure linked through *—O-M-O—* and a structure linked through *—CH$_2$CH$_2$—* are particularly preferable.

The siloxane compound (the siloxane compound before a linked structure is formed through the linking group) that is used as a raw material of the siloxane compound layer is not particularly limited as long as the siloxane compound has a functional group imparting the linked structure. Preferred examples of this polysiloxane compound include one or two or more compounds selected from methacrylate-modified poly dialkylsiloxane, methacrylate-modified polydiarylsiloxane, methacrylate-modified polyalkylarylsiloxane, thiol-modified polydialkylsiloxane, thiol-modified polydiarylsiloxane, thiol-modified polyalkylarylsiloxane, hydroxy-modified polydialkylsiloxane, hydroxy-modified polydiarylsiloxane, hydroxy-modified polyalkylarylsiloxane, amine-modified polydialkylsiloxane, amine-modified polydiarylsiloxane, amine-modified polyalkylarylsiloxane, vinyl-modified polydialkylsiloxane, vinyl-modified polydiarylsiloxane, vinyl-modified polyalkylarylsiloxane, carboxy-modified polydialkylsiloxane, carboxy-modified polydiarylsiloxane, carboxy-modified polyalkylarylsiloxane, hydrosilyl-modified polydialkylsiloxane, hydrosilyl-modified polydiarylsiloxane, hydrosilyl-modified polyalkylarylsiloxane, epoxy-modified polydialkylsiloxane, epoxy-modified polydiarylsiloxane, epoxy-modified polyalkylarylsiloxane, oxetanyl-modified polydialkylsiloxane, oxetanyl-modified polydiarylsiloxane, and oxetanyl-modified polyalkylarylsiloxane.

Further, in the polysiloxane compound exemplified above, the modified site due to each functional group may be a terminal or a side chain. In addition, it is preferable that two or more modified sites are present in one molecule. Further, each functional group introduced due to the modification may further include a substituent.

The ratio between the amount of the alkyl group and the amount of the aryl group in the above-described "polyalkylarylsiloxane" is not particularly limited. In other words, the structure of the "polyalkylarylsiloxane" may have a dialkylsiloxane structure or a diarylsiloxane structure.

In the siloxane compound exemplified above, the number of carbon atoms of the alkyl group is preferably in a range of 1 to 10, more preferably in a range of 1 to 5, still more preferably in a range of 1 to 3, and particularly preferably methyl. Further, in the siloxane compound exemplified above, the number of carbon atoms of the aryl group is preferably in a range of 6 to 20, more preferably in a range of 6 to 15, still more preferably in a range of 6 to 12, and particularly preferably phenyl.

It is preferable that the siloxane compound layer of the present invention has at least one structure selected from (a) and (b) described below.

(a) A structure which has a structure represented by Formula (1a) and a structure represented by Formula (2a) or (3a)

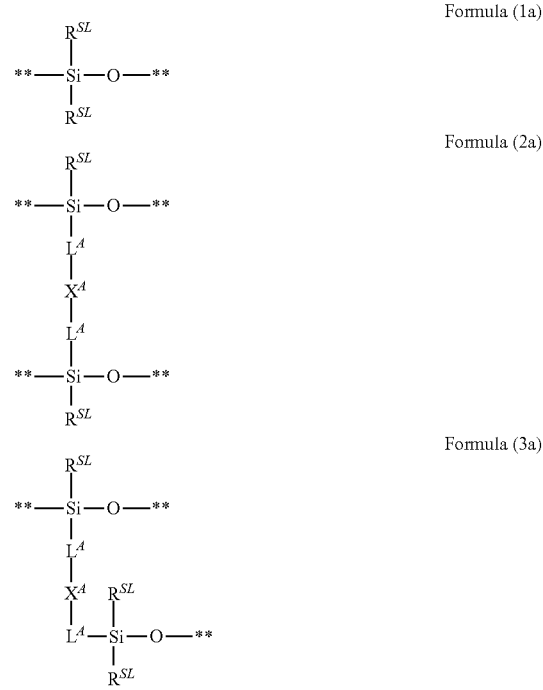

(b) A structure represented by Formula (4a)

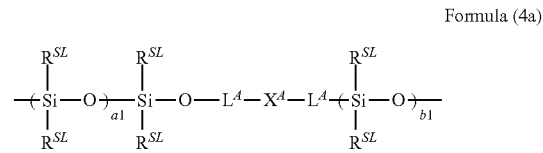

In the formulae, R$^{SL}$ represents an alkyl group or an aryl group. L$^A$ represents a single bond or a divalent linking group. X$^A$ represents a linking group selected from *—O-M$^1$-O—*, *—S-M$^1$-S—*, *—O—CH$_2$—O—*, *—S—CH$_2$CH$_2$—*, *—OC(=O)O—*, *—CH$_2$CH$_2$—*, and *—C(=O)O$^-$N$^+$(R$^d$)$_3$—*. M$^1$ represents Zr, Fe, Zn, B, Al, or Ga, R$^d$ represents a hydrogen atom or an alkyl group. a1 and b1 represent an integer of 2 or greater (preferably an integer of 5 or greater). The symbol * represents a linking site. The symbol  represents a linking site in a siloxane bond (that is, in Formulae (1a) to (3a), the symbol  represents a linking site with respect to a Si atom in a case where an O atom is present next to the symbol  and the symbol  represents a linking site with respect to an O atom in a case where a Si atom is present next to the symbol **).

In addition, it is preferable that the terminal structure of Formula (4a) is a group selected from a hydrogen atom, a mercapto group, an amino group, a vinyl group, a carboxy group, an oxetane group, a sulfonic acid group, and a phosphonic acid group.

In a case where R$^{SL}$ and R$^d$ represent an alkyl group, the number of carbon atoms thereof is preferably in a range of 1 to 10, more preferably in a range of 1 to 5, and still more preferably in a range of 1 to 3, and methyl is particularly preferable.

In a case where R$^{SL}$ represents an aryl group, the number of carbon atoms thereof is preferably in a range of 6 to 20, more preferably in a range of 6 to 15, and still more preferably in a range of 6 to 12, and a phenyl group is particularly preferable.

In a case where $L^A$ represents a divalent linking group, an alkylene group (an alkylene group having preferably 1 to 10 carbon atoms and more preferably 1 to 5 carbon atoms), an arylene group (an arylene group having 6 to 20 carbon atoms and more preferably 6 to 15 carbon atoms, and still more preferably a phenylene group), or —Si($R^{SL}$)$_2$—O— is preferable ($R^{SL}$ has the same definition as that for $R^{SL}$ of Formula (2a) and the preferable forms are the same as each other, and "O" in —Si($R^{SL}$)$_2$—O— is linked to Si shown in the formula above).

It is preferable that the structure of (a) described above has a repeating unit represented by Formula (5a) in addition to the structure represented by any of Formulae (1a) to (3a).

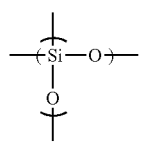

Formula (5a)

It is also preferable that the repeating unit represented by Formula (5a) has a structure in which repeating units represented by Formula (5) are linked to each other through a siloxane bond in the siloxane compound layer.

In the siloxane compound layer of the present invention, the content of the repeating unit represented by Formula (5a) is preferably in a range of 0.01 to 0.55, more preferably in a range of 0.03 to 0.40, and still more preferably in a range of 0.05 to 0.25.

The content of the repeating unit represented by Formula (5a) is acquired by setting a siloxane compound layer cut to have a size of 2.5 cm2 as a sample for measurement, measuring the Si2P (around 98 to 104 eV) of this sample for measurement under conditions of Al-Kα rays (1490 eV, 25 W, 100 umφ) as an X-ray source, a measurement region of 300 μm×300 μm, Pass Energy 55 eV, and Step 0.05 eV using X-ray photoelectron spectroscopy (device: Quantra SXM, manufactured by Ulvac-PHI, Inc.), separating and quantifying the peaks of the T component (103 eV) and the Q component (104 eV), and comparing the results. In other words, "[SA]/([SA]+[ST])" is calculated based on the total value [ST] of the fluorescent X-ray intensity [SA] of the Si—O bond energy peak of the repeating unit (Q component) represented by Formula (5a) and the intensity of the Si—O bond energy peak of the structure (T component) other than the repeating unit represented by Formula (5a) and the calculated value is set as the content of the repeating unit represented by Formula (5a).

In the present invention, the thickness of the siloxane compound layer is preferably in a range of 10 to 3000 nm and more preferably in a range of 100 to 1500 nm.

(Use and Properties of Gas Separation Membrane)

The gas separation membrane (the composite membrane and the asymmetric membrane) of the present invention can be suitably used according to a gas separation recovery method and a gas separation purification method. For example, a gas separation membrane which is capable of efficiently separating specific gas from a gas mixture containing, for example, hydrocarbon such as hydrogen, helium, carbon monoxide, carbon dioxide, hydrogen sulfide, oxygen, nitrogen, ammonia, a sulfur oxide, a nitrogen oxide, methane, or ethane; unsaturated hydrocarbon such as propylene; or a perfluoro compound such as tetrafluoroethane can be obtained. Particularly, it is preferable that a gas separation membrane selectively separating carbon dioxide from a gas mixture containing carbon dioxide and hydrocarbon (methane) is obtained.

In addition, in a case where gas subjected to a separation treatment is mixed gas of carbon dioxide and methane, the permeation rate of the carbon dioxide at 30° C. and 5 MPa is preferably greater than 20 GPU, more preferably greater than 30 GPU, and still more preferably in a range of 35 GPU to 500 GPU. The ratio between permeation rates of carbon dioxide and methane ($R_{CO2}/R_{CH4}$) is preferably 15 or greater, more preferably 20 or greater, still more preferably 23 or greater, and particularly preferably in a range of 25 to 50. $R_{CO2}$ represents the permeation rate of carbon dioxide and $R_{CH4}$ represents the permeation rate of methane.

Further, 1 GPU is 1×10$^{-6}$ cm$^3$ (STP)/cm$^2$·cm·sec·cmHg.

(Other Components and the Like)

Various polymer compounds can also be added to the gas separation layer of the gas separation membrane of the present invention in order to adjust the physical properties of the membrane. As the polymer compounds, a polyurethane resin, a polyamide resin, a polyester resin, an epoxy resin, a phenol resin, a polycarbonate resin, a polyvinyl butyral resin, a polyvinyl formal resin, shellac, a vinyl-based resin, an acrylic resin, a rubber-based resin, waxes, and other natural resins can be used. Further, these may be used in combination of two or more kinds thereof.

Further, a non-ionic surfactant, a cationic surfactant, or an organic fluoro compound can be added to the gas separation membrane of the present invention in order to adjust the physical properties of the liquid.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from known surfactants and derivatives thereof in the related art.

Further, a polymer dispersant may be included, and specific examples of the polymer dispersant include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The conditions of forming the gas separation membrane of the present invention are not particularly limited. The temperature thereof is preferably in a range of −30° C. to 100° C., more preferably in a range of −10° C. to 80° C., and particularly preferably in a range of 5° C. to 50° C.

In the present invention, gas such as air or oxygen may be allowed to coexist during membrane formation, but it is desired that the membrane is formed under an inert gas atmosphere.

In the gas separation membrane of the present invention, the content of the polyimide compound in the gas separation layer is not particularly limited as long as desired gas separation performance can be obtained. From the viewpoint of further improving gas separation performance, the content of the polyimide compound in the gas separation layer is preferably 20% by mass or greater, more preferably 40% by mass or greater, still more preferably 60% by mass or greater, and even still more preferably 70% by mass or greater. Further, the content of the polyimide compound in the gas separation layer may be 100% by mass, but is typically 99% by mass or less.

[Method of Separating Gas Mixture]

The gas separation method of the present invention is a method that includes selectively permeating carbon dioxide from mixed gas containing carbon dioxide and methane. The gas pressure at the time of gas separation is preferably in a range of 0.5 MPa to 10 MPa, more preferably in a range of 1 MPa to 10 MPa, and still more preferably in a range of 2 MPa to 7 MPa. Further, the temperature for separating gas is preferably in a range of −30° C. to 90° C. and more preferably in a range of 15° C. to 70° C. In the mixed gas containing carbon dioxide and methane gas, the mixing ratio of carbon dioxide to methane gas is not particularly limited. The mixing ratio thereof (carbon dioxide:methane gas) is preferably in a range of 1:99 to 99:1 (volume ratio) and more preferably in a range of 5:95 to 90:10.

[Gas Separation Module and Gas Separation Device]

A gas separation membrane module can be prepared using the gas separation membrane of the present invention. Examples of the module include a spiral type module, a hollow fiber type module, a pleated module, a tubular module, and a plate & frame type module.

Moreover, it is possible to obtain a gas separation device having means for performing separation and recovery of gas or performing separation and purification of gas by using the gas separation composite membrane of the present invention or the gas separation membrane module. The gas separation composite membrane of the present invention may be applied to a gas separation device which is used together with an absorption liquid described in JP2007-297605A according to a membrane/absorption hybrid method.

EXAMPLES

Hereinafter, the present invention will be described in detail with reference to examples, but the present invention is not limited these examples.

Synthesis Example

Synthesis of polyimide (P-01)

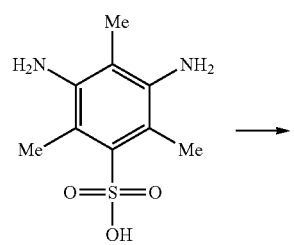

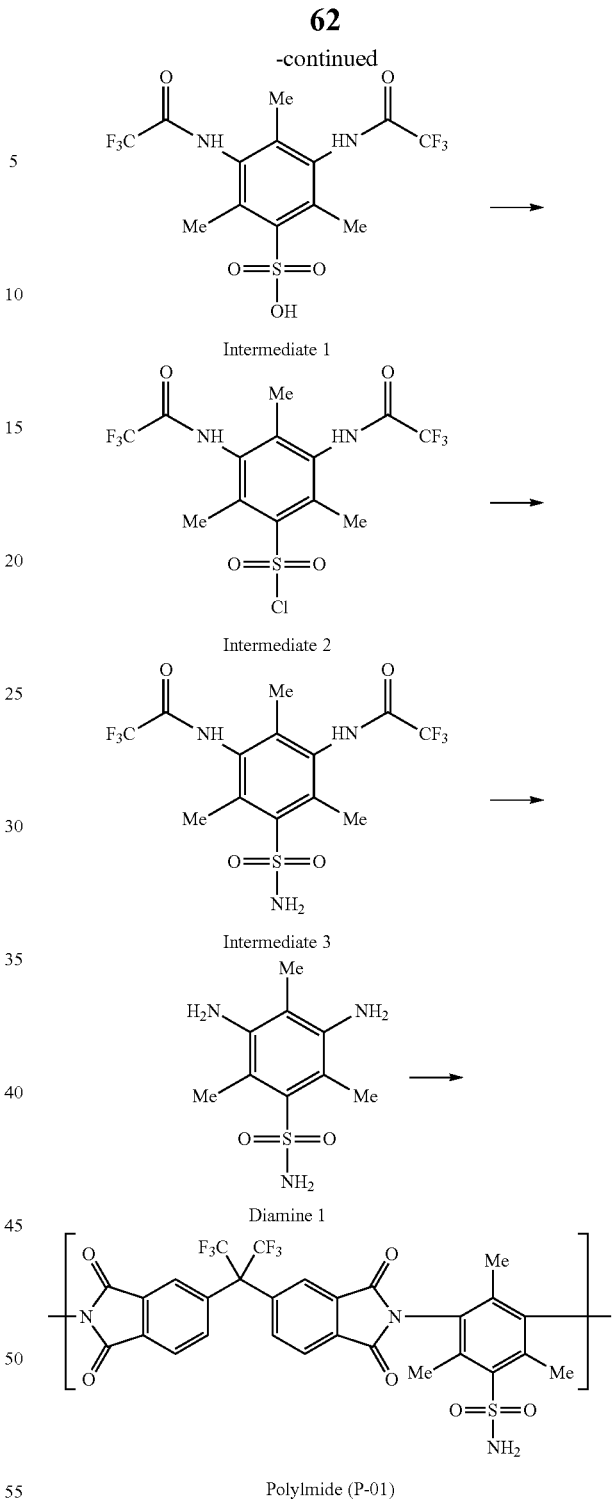

Synthesis of Intermediate 1

Diaminomesitylenesulfonic acid (manufactured by Wako Pure Chemical Industries, Ltd.) (60 g), acetonitrile (manufactured by Wako Pure Chemical Industries, Ltd.) (380 g), and pyridine (manufactured by Wako Pure Chemical Industries, Ltd.) (23 g) were put into a 1 L flask. Next, a trifluoroacetic anhydride (manufactured by Wako Pure Chemical Industries, Ltd.) (115 g) was carefully added dropwise to the flask under an ice-cooling condition and then the mixture was allowed to react at 70° C. for 2 hours. The obtained solution was cooled to room temperature (25° C.), methanol (manufactured by Wako Pure Chemical Industries, Ltd.) (30 g) was added thereto, and then the solution was stirred for 1 hour. The obtained solution was concentrated under reduced pressure and purified using hydrochloric acid, thereby obtaining an intermediate 1 (110 g).

Synthesis of Intermediate 2

Acetonitrile (manufactured by Wako Pure Chemical Industries, Ltd.) (440 mL) and the intermediate 1 (68 g) were put into a 1 L flask. Next, thionyl chloride (manufactured by Wako Pure Chemical Industries, Ltd.) (115 g) and dimethylformamide (manufactured by Wako Pure Chemical Industries, Ltd.) (0.9 g) were carefully added to the flask, the internal temperature was increased to 70° C. while paying attention to heat generation and foaming, and then the solution was stirred for 2 hours. The obtained reaction mixture was distilled off under reduced pressure, poured into ice, and purified, thereby obtaining an intermediate 2 (65 g).

Synthesis of Intermediate 3

Ammonia water (manufactured by Wako Pure Chemical Industries, Ltd.) (90 g) was put into a 500 mL flask. Next, a liquid obtained by suspending the intermediate 2 (43 g) in tetrahydrofuran (manufactured by Wako Pure Chemical Industries, Ltd.) (130 g) was carefully added to the flask under an ice-cooling condition. The obtained solution was stirred at 40° for 2 hours, concentrated under reduced pressure, and purified, thereby obtaining an intermediate 3 (30 g).

Synthesis of Diamine 1

Figure 3:
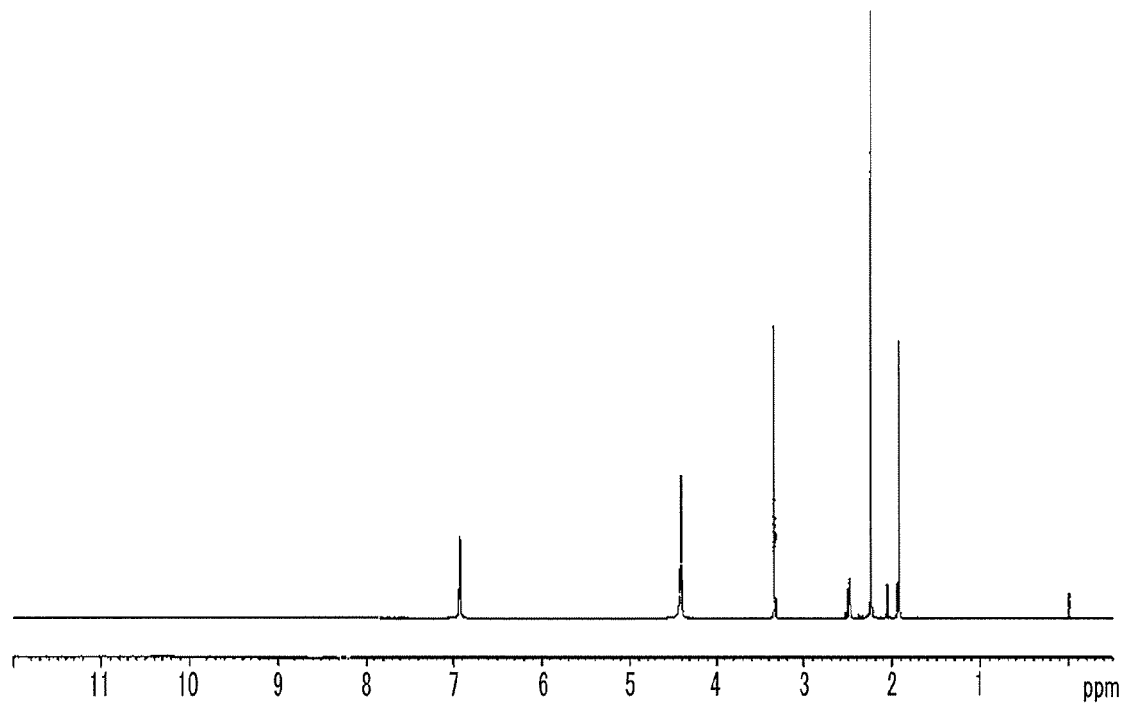
FIG. 3 is $^1$H NMR spectrum data of a diamine 1 synthesized in an example.

The intermediate 3 (30 g) and methanol (manufactured by Wako Pure Chemical Industries, Ltd.) (100 g) were put into a 200 mL flask. Next, methanesulfonic acid (manufactured by Wako Pure Chemical Industries, Ltd.) (30 g) was carefully added to the flask, the temperature was increased while paying attention to heat generation, and then the solution was stirred at 120° C. for 30 minutes. The obtained reaction solution was cooled, poured into a potassium carbonate solution, and purified, thereby obtaining a diamine 1 (11 g). The results of $^1$H NMR (heavy solvent: DMSO-d6) of the diamine 1 are shown in FIG. 3.

Synthesis of Polyimide (P-01)

m-Cresol (manufactured by Wako Pure Chemical Industries, Ltd.) (100 g), the diamine 1 (10.00 g), and 6FDA (manufactured by Tokyo Chemical Industry Co., Ltd.) (19.37 g) were put into a 500 mL flask. Next, toluene (manufactured by Wako Pure Chemical Industries, Ltd.) (10 g) and isoquinoline (manufactured by Wako Pure Chemical Industries, Ltd.) (1.5 g) were added to the flask, and the mixture was heated to 180° C. and then allowed to react for 6 hours. The obtained solution was cooled to room temperature (25° C.) and diluted with acetone (manufactured by Wako Pure Chemical Industries, Ltd.). Thereafter, isopropyl alcohol (manufactured by Wako Pure Chemical Industries, Ltd.) was added to the solution and then a polymer was obtained as a solid. After the similar re-precipitation was repeatedly carried out twice, the resultant was dried at 80° C., thereby obtaining a polyimide (P-01) (24 g).

Figure 4:
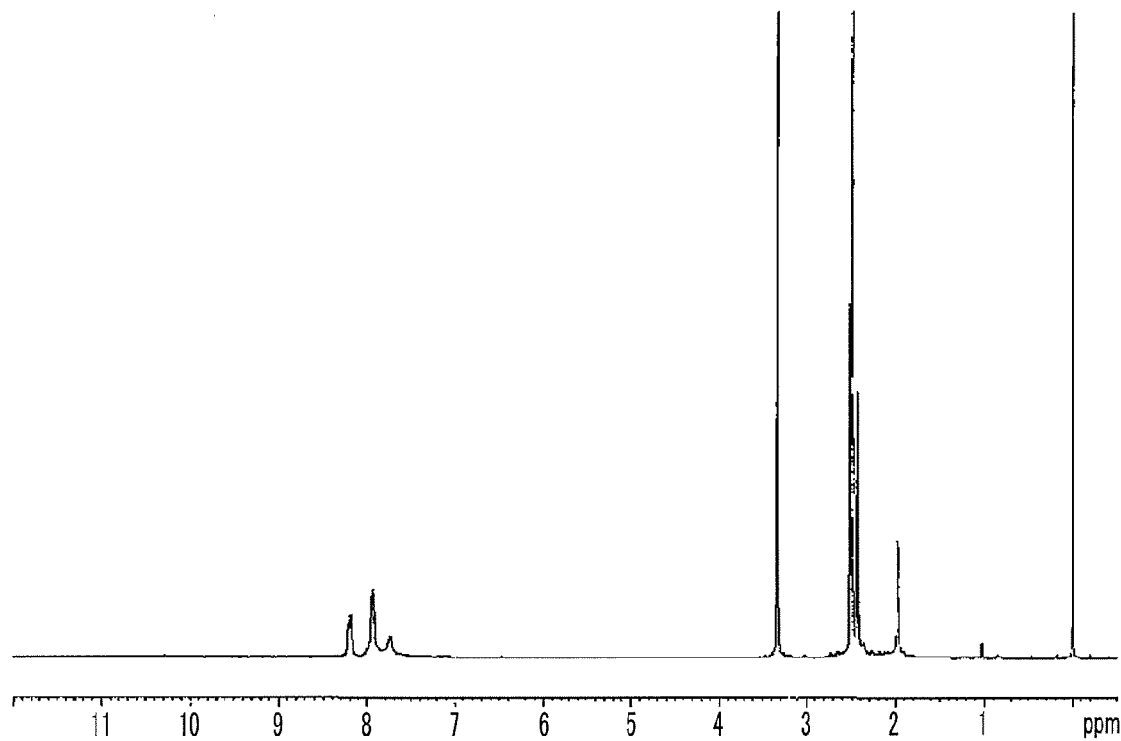
FIG. 4 is $^1$H NMR spectrum data of a polyimide (P-01) synthesized in an example.

The results of $^1$H NMR (heavy solvent: DMSO-d6) of the polyimide (P-01) are shown in FIG. 4.

Synthesis of Polyimide (P-02)

A polyimide (P-02) (22 g) was obtained in the same manner as that of the synthesis of the polyimide (P-01) except that the diamine 1 (9.00 g) and 3,5-diaminobenzoic acid (manufactured by Tokyo Chemical Industry Co., Ltd.) (0.66 g) were used in place of the diamine 1 (10.00 g) in the synthesis of the polyimide (P-01).

Polyimide (P-02)

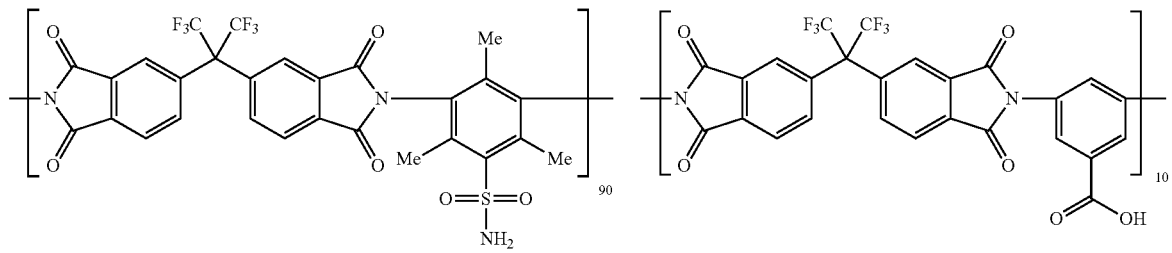

Figure 5:
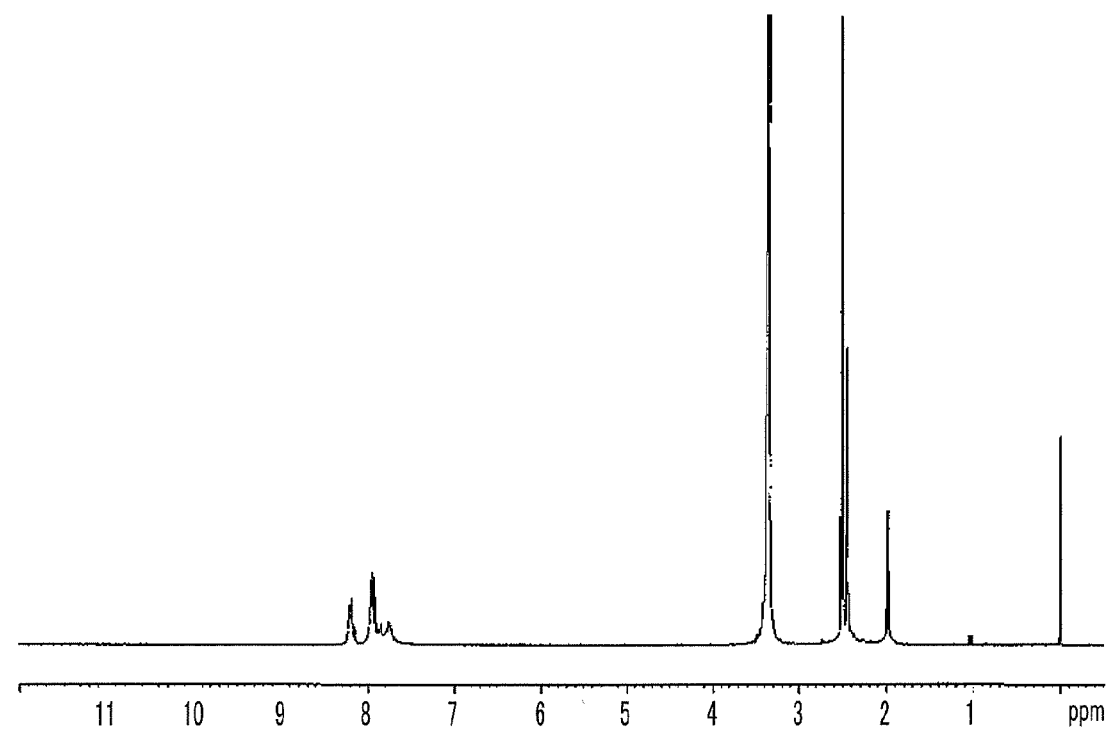
FIG. 5 is $^1$H NMR spectrum data of a polyimide (P-02) synthesized in an example.

The results of $^1$H NMR (heavy solvent: DMSO-d6) of the polyimide (P-02) are shown in FIG. 5.

Comparative Polymer (C-01)

A comparative polymer (C-01) (13 g) was synthesized in the same manner as that of the synthesis of the polyimide (P-01) except that the diamine 1 was changed into diaminomesitylenesulfonic acid (manufactured by Wako Pure Chemical Industries, Ltd.) having the same molar amount as that of the diamine 1, triethylamine (4.41 g) was added, and hydrochloric acid was used during the purification of the polymer in the synthesis of the polyimide (P-01).

Comparative Polymer (C-01)

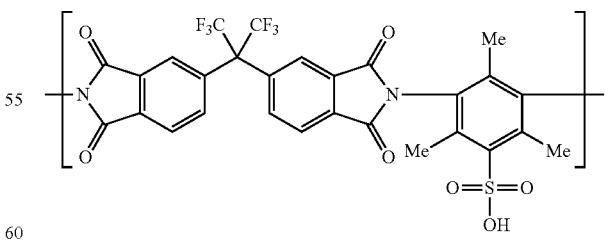

Comparative Polymer (C-02)

2,3,5,6-tetramethyl-1,4-phenylenediamine (2.97 g) and N-methylpyrrolidone (50 mL) were put into a 300 mL flask. Next, 6FDA (manufactured by Tokyo Chemical Industry Co., Ltd.) (8.04 g) was added under an ice-cooling condition and the mixture was washed with N-methylpyrrolidone (6 mL). After the obtained solution was stirred at 40° C. for 5 hours, pyridine (manufactured by Wako Pure Chemical Industries, Ltd.) (0.43 g) and acetic anhydride (manufactured by Wako Pure Chemical Industries, Ltd.) (6.10 g) were added thereto, and the reaction solution was heated to 80° C. and then stirred for 3 hours. The obtained solution was cooled to room temperature (25° C.), acetone was added thereto, methanol added thereto, and a comparative polymer (C-02) was allowed to be deposited as powder. The resultant was repeatedly washed with methanol twice and dried at 40° C., thereby obtaining a comparative polymer (C-02) (9.32 g).

Comparative Polymer (C-02)

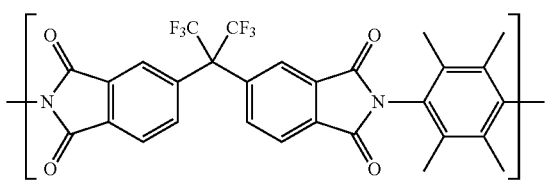

Comparative Polymer (C-03)

A commercially available product (product name: L-70, manufactured by Daicel Corporation, acetylation degree of 0.55) was used as cellulose acetate formed of the following structural unit (repeating unit). The acetylation degree indicates the mass percentage of bound acetic acid per unit mass.

Comparative Polymer (C-03)

Cellulose Acetate (Comparative Polymer)

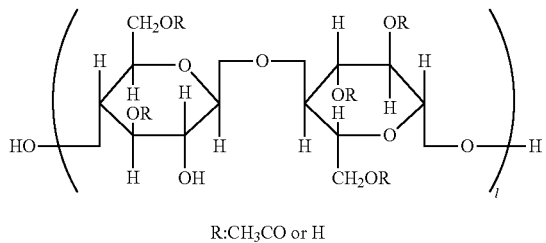

R:CH₃CO or H

Comparative Polymer (C-04)

A comparative polymer (C-04) was synthesized by referring to the description of JP2015-083296A.

Comparative Polymer (C-04)

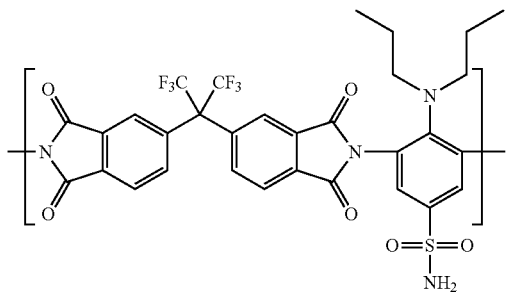

[Example 1] Preparation of Composite Membrane

<Preparation of PAN Porous Layer Provided with Smooth Layer>

(Preparation of Radiation-Curable Polymer Containing Dialkylsiloxane Group)

39 g of UV9300 (manufactured by Momentive Performance Materials Inc.), 10 g of X-22-162C (manufactured by Shin-Etsu Chemical Co, Ltd.), and 0.007 g of DBU (1,8-diazabicyclo[5.4.0]undeca-7-ene) were added to a 150 mL three-neck flask and dissolved in 50 g of n-heptane. The state of the solution was maintained at 95° for 168 hours, thereby obtaining a solution (viscosity at 25° C. was 22.8 mPa·s) of a radiation-curable polymer containing a polysiloxane group.

(Preparation of Polymerizable Radiation-Curable Composition)

5 g of the obtained radiation-curable polymer solution was cooled to 20° C. and diluted with 95 g of n-heptane. 0.5 g of UV9380C (manufactured by Momentive Performance Materials Inc.) and 0.1 g of ORGATIX TA-10 (manufactured by Matsumoto Fine Chemical Co., Ltd.) serving as photopolymerization initiators were added to the obtained solution, thereby preparing a polymerizable radiation-curable composition.

(Coating of Porous Support with Polymerizable Radiation-Curable Composition and Formation of Smooth Layer)

The polyacrilonitrile (PAN) porous layer (the polyacrylonitrile porous layer was present on the non-woven fabric layer, the membrane thickness including the thickness of the non-woven fabric layer was approximately 180 μm) was used as the support layer and spin-coated with the polymerizable radiation-curable composition, subjected to a UV treatment (Light Hammer 10, D-valve, manufactured by Fusion UV System, Inc.) under UV treatment conditions of a UV intensity of 24 kW/m for a treatment time of 10 seconds, and then dried. In this manner, a smooth layer containing a dialkylsiloxane group and having a thickness of 1 μm was formed on the porous support.

<Preparation of Composite Membrane>

A gas separation composite membrane illustrated in FIG. 2 was prepared (a smooth layer is not illustrated in FIG. 2).

0.08 g of the polyimide (P-01) and 7.92 g of tetrahydrofuran were mixed in a 30 mL brown vial bottle and then stirred for 30 minutes, and the PAN porous layer to which the smooth layer was imparted was spin-coated with the mixture to form a gas separation layer, thereby obtaining a composite membrane. The thickness of the polyimide (P-01) layer was approximately 100 nm, and the thickness of the polyacrylonitrile porous layer including the thickness of the non-woven fabric layer was approximately 180 μm.

Further, a polyacrylonitrile porous layer having a molecular weight cutoff of 100000 or less was used. Further, the carbon dioxide permeability of the porous layer at 40° C. and 4 MPa was 25000 GPU.

[Example 2] Preparation of Composite Membrane (Having Cross-Linked Structure)

A composite membrane was prepared in the same manner as that in Example 1 except that tetraisopropyl orthotitanate (manufactured by Tokyo Chemical Industry Co., Ltd.) (0.08 g) was further added as a crosslinking agent at the time of mixing 0.08 g of the polyimide (P-01) and 7.92 g of tetrahydrofuran in the <Preparation of composite membrane> in Example 1.

[Example 3] Preparation of Composite Membrane
(Having Protective Layer)

A protective layer was provided on the surface of the gas separation layer of the composite membrane prepared in Example 1 according to the following procedures.

In other words, the surface of the gas separation layer of the composite membrane prepared in Example 1 was spin-coated with a mixed solution obtained by mixing a vinyl Q resin (manufactured by Gelest Inc., product number: VQM-135) (10 g), hydrosilyl PDMS (manufactured by Gelest Inc., product number: HMS-301) (1 g), a Karstedt catalyst (manufactured by Sigma-Aldrich Co., LLC., product number of 479527) (5 mg), and heptane (90 g), dried at 80° C. for 5 hours, and then cured. In this manner, a gas separation composite membrane including a siloxane compound layer with a thickness of 500 nm was provided on the gas separation layer.

[Example 4] Preparation of Composite Membrane
(Having a Protective Layer, a Copolymerization
Component, and a Cross-Linked Structure)

A gas separation layer was formed in the same manner as in the <Preparation of composite membrane> of Example 1 except that the polyimide (P-01) was changed into the polyimide (P-02) and 3-aminopropyltrimethoxysilane (0.4 mg) was added as a crosslinking agent of the polyimide in the <Preparation of composite membrane> in Example 1. Next, a protective layer formed of a siloxane compound layer having a thickness of 500 nm was provided on the gas separation layer in the same manner as in Example 3, thereby obtaining a gas separation composite membrane.

[Comparative Examples 1 to 4] Preparation of
Composite Membrane

Composite membranes of Comparative Examples 1 to 4 were prepared in the same manner as in Example 1 except that the polyimide (P-01) was changed into the comparative polymers (C-01) to (C-04) in Example 1. Further, since the comparative polymer (C-01) was not dissolved in tetrahydrofuran, methanol was used in place of tetrahydrofuran as a solvent.

[Test Example 1] Evaluation of $CO_2$ Permeation
Rate and Gas Separation Selectivity of Gas
Separation Membrane The gas separation performance was evaluated in the following manner using the gas separation membranes (composite membranes) of each of the examples and comparative examples.

Permeation test samples were prepared by cutting the gas separation membranes together with the porous supports (support layers) such that the diameter of each membrane became 5 cm. Using a gas permeability measurement device manufactured by GTR Tec Corporation, mixed gas in which the volume ratio of carbon dioxide ($CO_2$) to methane ($CH_4$) was 6:94 was adjusted and supplied such that the total pressure on the gas supply side became 5 MPa (partial pressure of $CO_2$: 0.3 MPa), the flow rate thereof became 500 mL/min, and the temperature thereof became 30° C. The permeating gas was analyzed using gas chromatography. The gas permeabilities of the gas separation membranes were compared to each other by calculating gas permeation rates as gas permeability (Permeance). The unit of gas permeability (gas permeation rate) was expressed by the unit of GPU [1 GPU=1×10$^{-6}$ cm$^3$ (STP)/cm$^2$·sec·cmHg]. The gas separation selectivity was calculated as the ratio ($R_{CO2}/R_{CH4}$) of the permeation rate $R_{CO2}$ of $CO_2$ to the permeation rate $R_{CH4}$ of $CH_4$ of the membrane.

[Test Example 2] Toluene Exposure Test

Each gas separation membrane prepared in each of the examples and comparative examples was put into a stainless steel container in which a Petri dish containing a toluene solvent was placed, and the stainless steel container was sealed. Thereafter, the sealed container was stored under a temperature condition of 25° C. for 10 minutes and gas separation performance was evaluated by cutting the gas separation membrane to have a diameter of 5 cm and preparing a permeation test sample in the same manner as in [Test Example 1] described above. By performing this toluene exposure, plasticization resistance of the gas separation membrane with respect to impurity components such as benzene, toluene, or xylene can be evaluated.

The results of each test example are listed in Table 1.

TABLE 1

| | Type of polymer used for gas separation layer | Weight-average molecular weight of polymer used for gas separation layer | Test Example 1 | | Test Example 2 (after toluene exposure) |
|---|---|---|---|---|---|
| | | | $CO_2$ permeation rate | $R_{CO2}/R_{CH4}$ | $R_{CO2}/R_{CH4}$ |
| Example 1 | P-01 | 120,000 | 39 | 26 | 20 |
| Example 2 | P-01 | 120,000 | 46 | 27 | 23 |
| Example 3 | P-01 | 120,000 | 40 | 27 | 22 |
| Example 4 | P-02 | 160,000 | 41 | 28 | 23 |
| Comparative Example 1 | C-01 | 80,000 | (2000) | (1) | (1) |
| Comparative Example 2 | C-02 | 140,000 | 44 | 13 | 1 |
| Comparative Example 3 | C-03 | 200,000 | 20 | 20 | 3 |
| Comparative Example 4 | C-04 | 40,000 | 35 | 24 | 15 |

The comparative polymer (C-01) was not dissolved in tetrahydrofuran as described above. Therefore, the comparative polymer (C-01) was dissolved in methanol for coating and then used for membrane formation. However, the obtained gas separation layer had a large amount of membrane defects and gas separation performance was not exhibited.

From the results described above, it was understood that an excellent gas separation method, an excellent gas separation module, and a gas separation device provided with this gas separation module can be provided by applying the gas separation membrane of the present invention.

EXPLANATION OF REFERENCES

1: gas separation layer
2: porous layer
3: non-woven fabric layer
10, 20 gas separation composite membrane

What is claimed is:

1. A gas separation membrane comprising:
a gas separation layer containing a polyimide compound, wherein the polyimide compound has a repeating unit represented by Formula (I),

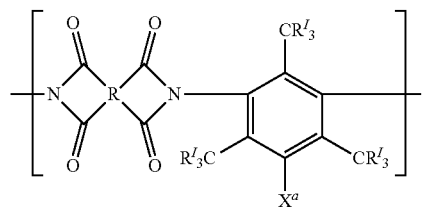
(I)

in Formula (I), $R^I$ represents a hydrogen atom, an alkyl group, or a halogen atom, and $X^a$ represents a sulfamoyl group, an alkoxysulfonyl group, a carboxy group, a hydroxy group, an acyloxy group, or a halogen atom, and R represents a group having a structure represented by any of Formulae (I-1) to (I-28), where $X^1$ to $X^3$ each independently represent a single bond or a divalent linking group, L represents —CH=CH— or —CH$_2$—, $R^1$ and $R^2$ each independently represent a hydrogen atom or a substituent, and the symbol "*" represents a binding site with respect to a carbonyl group in Formula (I)

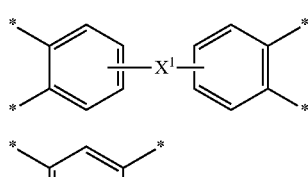
(I-1)

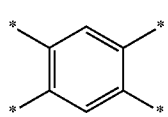
(I-2)

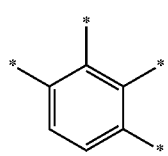
(I-3)

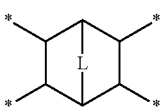
(I-4)

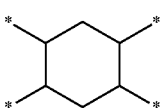
(I-5)

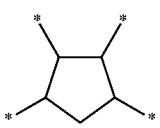
(I-6)

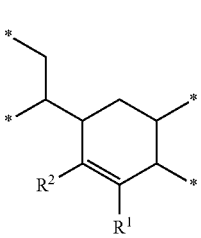
(I-7)

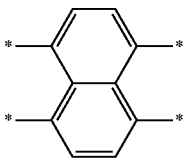
(I-8)

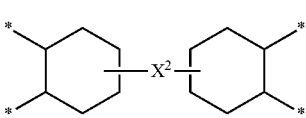
(I-9)

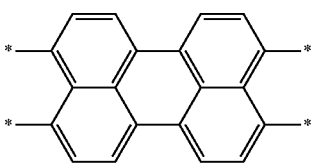
(I-10)

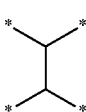
(I-11)

(I-12)

(I-13)

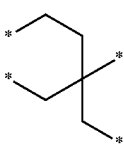
(I-14)

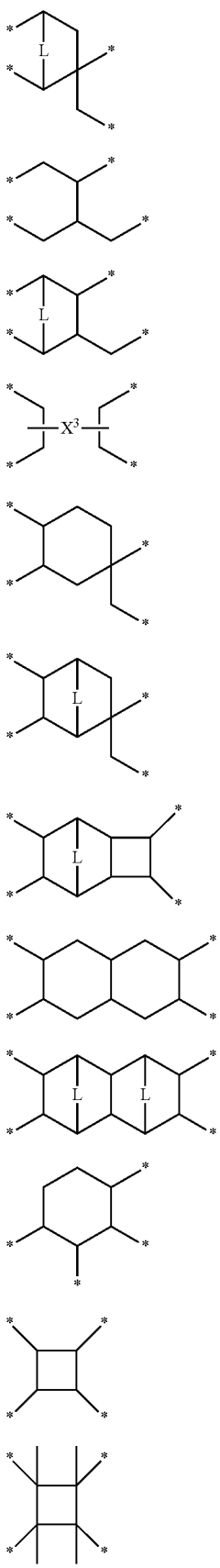

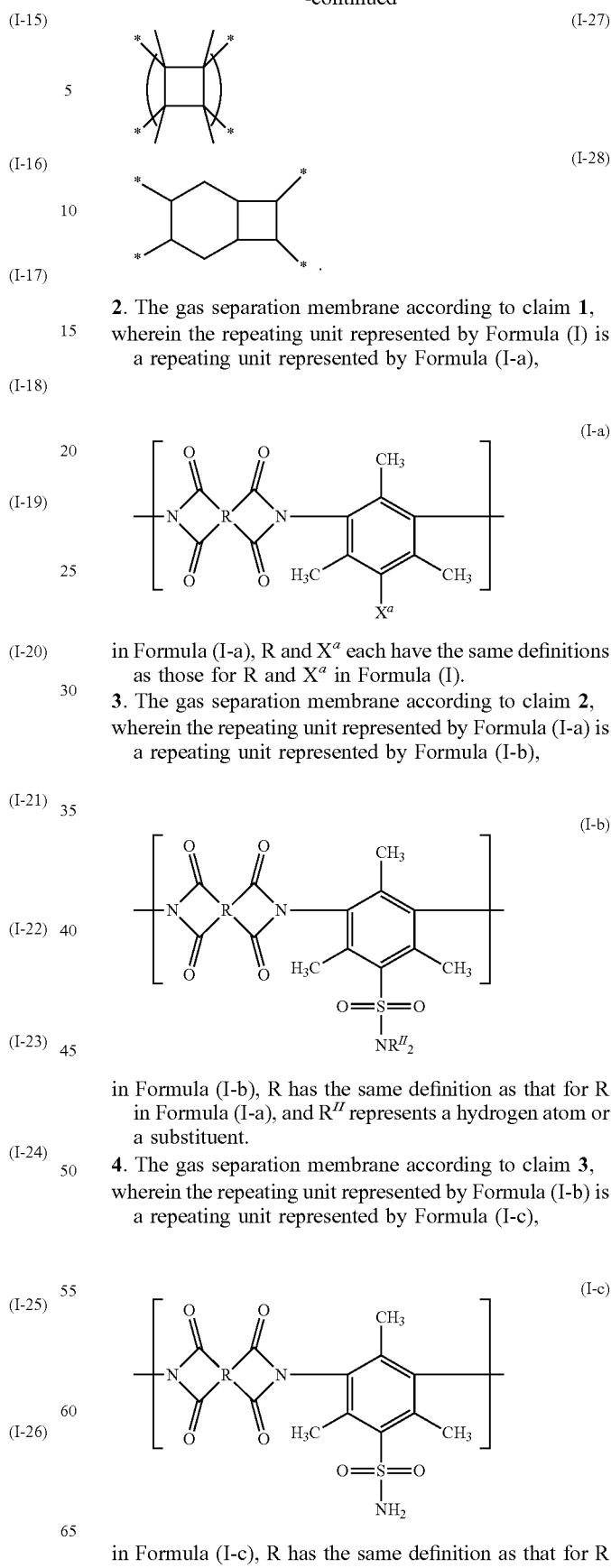

2. The gas separation membrane according to claim 1, wherein the repeating unit represented by Formula (I) is a repeating unit represented by Formula (I-a), in Formula (I-a), R and $X^a$ each have the same definitions as those for R and $X^a$ in Formula (I).

3. The gas separation membrane according to claim 2, wherein the repeating unit represented by Formula (I-a) is a repeating unit represented by Formula (I-b), in Formula (I-b), R has the same definition as that for R in Formula (I-a), and $R^H$ represents a hydrogen atom or a substituent.

4. The gas separation membrane according to claim 3, wherein the repeating unit represented by Formula (I-b) is a repeating unit represented by Formula (I-c), in Formula (I-c), R has the same definition as that for R in Formula (I-b).

5. The gas separation membrane according to claim 1, wherein the polyimide compound has at least one repeating unit selected from a repeating unit represented by Formula (II-a) and a repeating unit represented by Formula (II-b) or does not have both of the repeating unit represented by Formula (II-a) and the repeating unit represented by Formula (II-b),

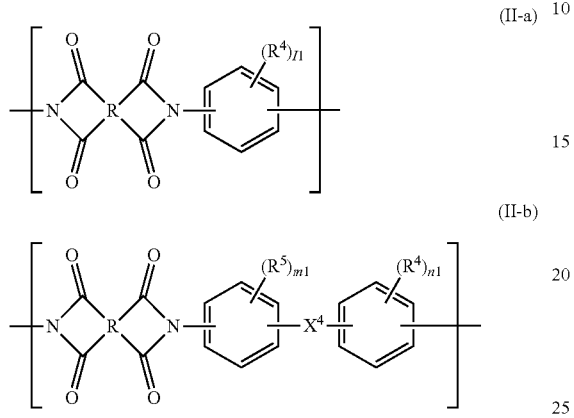

in Formulae (II-a) and (II-b), R has the same definition as that for R in Formula (I), $R^4$ to $R^6$ each independently represent a substituent, l1, m1, and n1 each independently represent an integer of 0 to 4, and $X^4$ represents a single bond or a divalent linking group, where the repeating unit represented by Formula (II-a) does not include the repeating unit represented by Formula (I).

6. The gas separation membrane according to claim 5, wherein the ratio of the molar amount of the repeating unit represented by Formula (I) to the total molar amount of the repeating unit represented by Formula (I), the repeating unit represented by Formula (II-a), and the repeating unit represented by Formula (II-b) in the polyimide compound is in a range of 50% to 100% by mole.

7. The gas separation membrane according to claim 6, wherein the polyimide compound consists of the repeating unit represented by Formula (I) or the remainder other than the repeating unit represented by Formula (I) consists of the repeating unit represented by Formula (II-a) or (II-b) in a case where the polyimide compound has a repeating unit other than the repeating unit represented by Formula (I).

8. The gas separation membrane according to claim 1, wherein the polyimide compound is a polyimide compound in which a cross-linked structure is formed using a metal alkoxide as a crosslinking agent.

9. The gas separation membrane according to claim 1, wherein the gas separation membrane is a gas separation composite membrane which includes a gas permeating support layer and the gas separation layer on the upper side of the support layer.

10. The gas separation membrane according to claim 9, wherein the support layer includes a non-woven fabric layer and a porous layer in this order.

11. The gas separation membrane according to claim 1, wherein, in a case where gas to be subjected to a separation treatment is mixed gas of carbon dioxide and methane, a permeation rate of carbon dioxide at 30° C. and 5 MPa is greater than 20 GPU and a ratio ($R_{CO2}/R_{CH4}$) between permeation rates of carbon dioxide and methane is 15 or greater.

12. The gas separation membrane according to claim 1, which is used for selective permeation of carbon dioxide from gas containing the carbon dioxide and methane.

13. A gas separation module comprising:
the gas separation membrane according to claim 1.

14. A gas separation device comprising:
the gas separation module according to claim 13.

15. A gas separation method comprising:
selectively permeating carbon dioxide from gas containing the carbon dioxide and methane using the gas separation membrane according to claim 1.

16. A polyimide compound having a repeating unit represented by Formula (I),

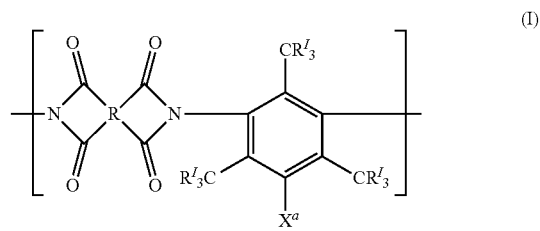

in Formula (I), $R^I$ represents a hydrogen atom, an alkyl group, or a halogen atom, and $X^a$ represents a sulfamoyl group, an alkoxysulfonyl group, a carboxy group, a hydroxy group, an acyloxy group, or a halogen atom, and R represents a group having a structure represented by any of Formulae (I-1) to (I-28), where $X^1$ to $X^3$ each independently represent a single bond or a divalent linking group, L represents —CH=CH— or —CH$_2$—, $R^1$ and $R^2$ each independently represent a hydrogen atom or a substituent, and the symbol "*" represents a binding site with respect to a carbonyl group in Formula (I)

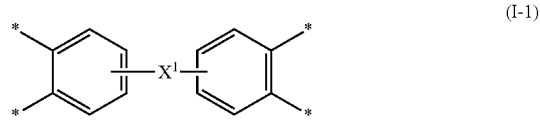

-continued
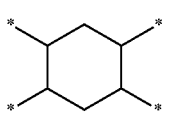 (I-5)
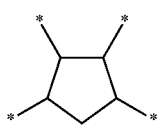 (I-6)
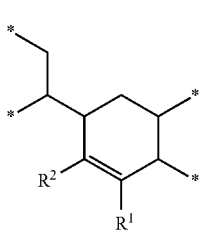 (I-7)
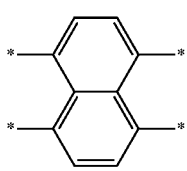 (I-8)
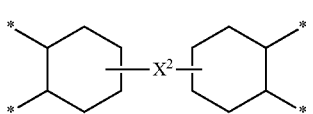 (I-9)
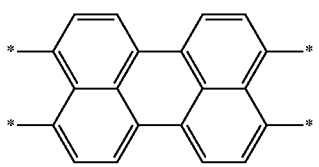 (I-10)
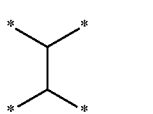 (I-11)
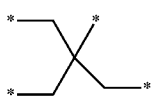 (I-12)
 (I-13)
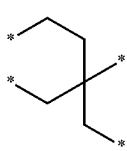 (I-14)
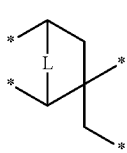 (I-15)
-continued
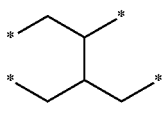 (I-16)
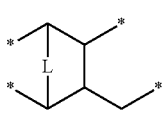 (I-17)
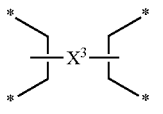 (I-18)
 (I-19)
 (I-20)
 (I-21)
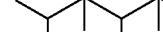 (I-22)
 (I-23)
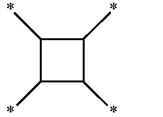 (I-24)
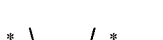 (I-25)
 (I-26)
(I-27)

-continued
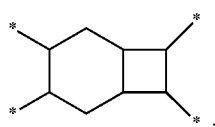
(I-28)
* * * * *